US010376047B1

(12) United States Patent
Ebbesson

(10) Patent No.: US 10,376,047 B1
(45) Date of Patent: Aug. 13, 2019

(54) FURNITURE FRAME SYSTEM

(71) Applicant: IKEA Supply AG, Pratteln (CH)

(72) Inventor: Tony Ebbesson, Almhult (SE)

(73) Assignee: IKEA Supply AG, Pratteln (CH)

( * ) Notice: Subject to any disclaimer, the term of this patent is extended or adjusted under 35 U.S.C. 154(b) by 0 days.

(21) Appl. No.: 15/939,782

(22) Filed: Mar. 29, 2018

(51) Int. Cl.
| | |
|---|---|
| *A47B 47/02* | (2006.01) |
| *F16B 12/34* | (2006.01) |
| *A47B 96/14* | (2006.01) |
| *A47B 57/50* | (2006.01) |
| *A47B 47/00* | (2006.01) |
| *F16B 12/50* | (2006.01) |

(52) U.S. Cl.
CPC ............ *A47B 47/021* (2013.01); *A47B 47/00* (2013.01); *A47B 47/0083* (2013.01); *A47B 57/50* (2013.01); *A47B 96/1416* (2013.01); *F16B 12/34* (2013.01); *F16B 12/50* (2013.01)

(58) Field of Classification Search
CPC .............. A47B 87/0215; A47B 47/021; A47B 87/0207; A47B 87/0246; A47B 87/0223; A47B 57/50; A47B 96/1441; A47B 47/0083; A47B 57/34; A47B 57/40; A47B 47/00; A47B 47/0025; A47B 47/0033; A47B 47/0041; A47B 47/005; A47B 47/02; A47B 47/028; A47B 57/00; A47B 57/06; A47B 57/08; A47B 57/10; A47B 57/16; A47B 57/20; A47B 57/22; A47B 57/30; A47B 57/32; A47B 57/48; A47B 96/1416; A47F 5/13; F16B 12/34; F16B 12/50

USPC ................. 211/26, 187; 312/265.5
See application file for complete search history.

(56) References Cited

U.S. PATENT DOCUMENTS

| | | | | |
|---|---|---|---|---|
| 3,862,691 | A * | 1/1975 | Mori ...................... | A47B 57/40 108/156 |
| 8,632,272 | B2 * | 1/2014 | Wojtowicz ......... | A47B 87/0215 211/182 |
| 8,672,150 | B2 * | 3/2014 | Chen ..................... | A47B 57/50 108/147.16 |
| 9,301,610 | B1 * | 4/2016 | Berry .................. | A47B 96/1416 |
| 9,493,177 | B1 * | 11/2016 | Chen ..................... | B62B 3/005 |
| 9,713,379 | B1 * | 7/2017 | Tsai ...................... | A47B 96/06 |
| 2005/0103733 | A1 * | 5/2005 | Saltzberg .............. | A47B 57/50 211/187 |
| 2005/0103734 | A1 * | 5/2005 | Saltzberg .............. | A47B 57/50 211/187 |
| 2011/0272373 | A1 * | 11/2011 | Wojtowicz ......... | A47B 87/0215 211/134 |
| 2011/0272541 | A1 * | 11/2011 | Wojtowicz ......... | A47B 87/0215 248/218.4 |

(Continued)

*Primary Examiner* — Hiwot E Tefera
(74) *Attorney, Agent, or Firm* — Merchant & Gould P.C.

(57) ABSTRACT

A furniture frame system comprises a first sheet metal beam comprising a first connector interface and a second sheet metal beam comprising a second connector. One of said first and second connector interfaces is a male connector interface, and the other of said first and second connector interfaces is a female connector interface. The female connector interface comprising a slider engagement edge. The male connector comprises a slot slider face configured to engage with and guide, or be guided by, the slider engagement edge. At least one of said slider engagement edge and said slot slider face defines a connector guide line for guiding the second connector along the abutment plane, which guide line is inclined relative to an axial end edge.

22 Claims, 18 Drawing Sheets

(56) References Cited

U.S. PATENT DOCUMENTS

| | | | | |
|---|---|---|---|---|
| 2011/0272542 | A1* | 11/2011 | Wojtowicz | A47B 87/0215 248/218.4 |
| 2012/0000873 | A1* | 1/2012 | Fitzgerald | A47B 57/50 211/153 |
| 2015/0282613 | A1* | 10/2015 | Chen | A47B 55/00 211/187 |

* cited by examiner

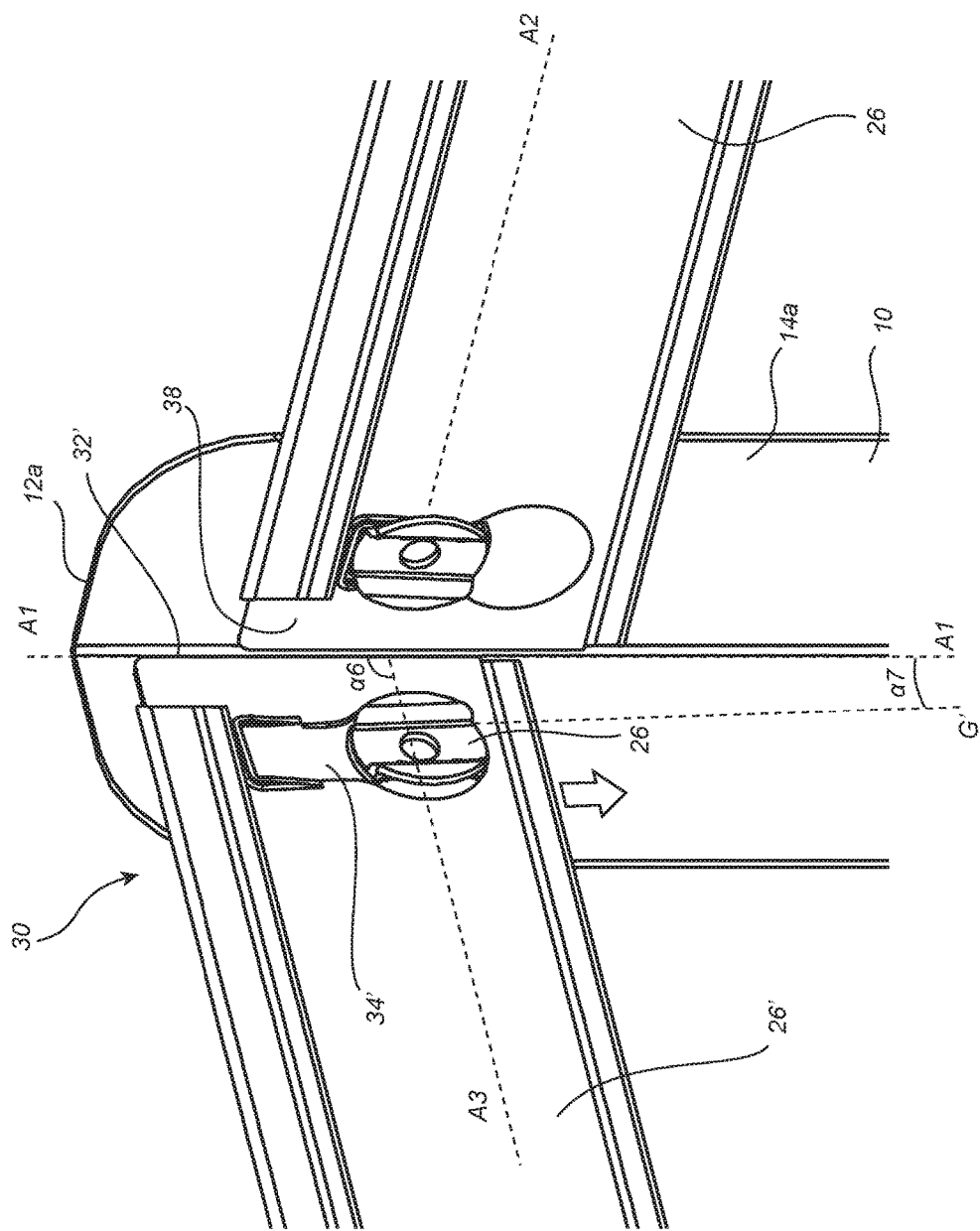

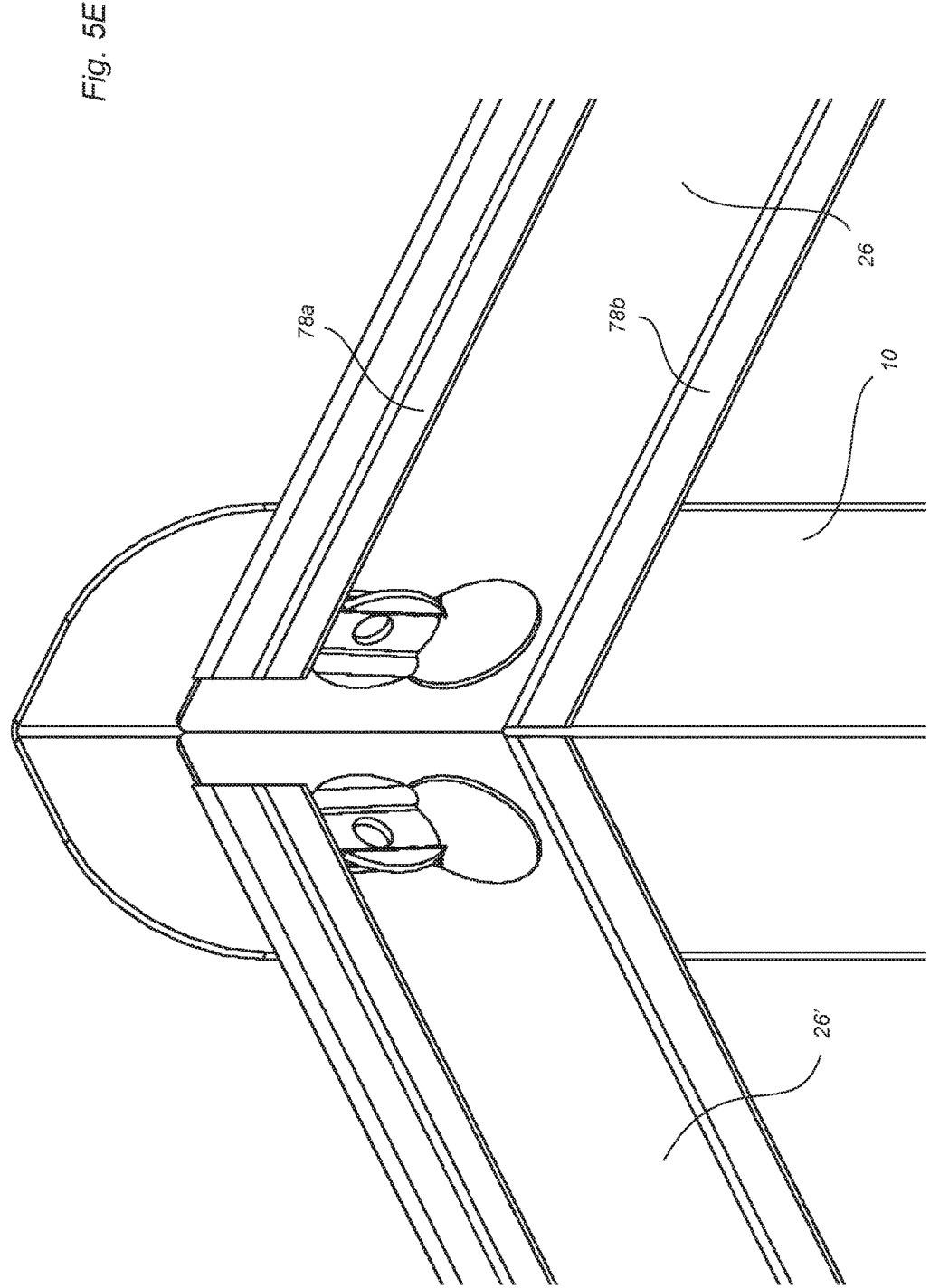

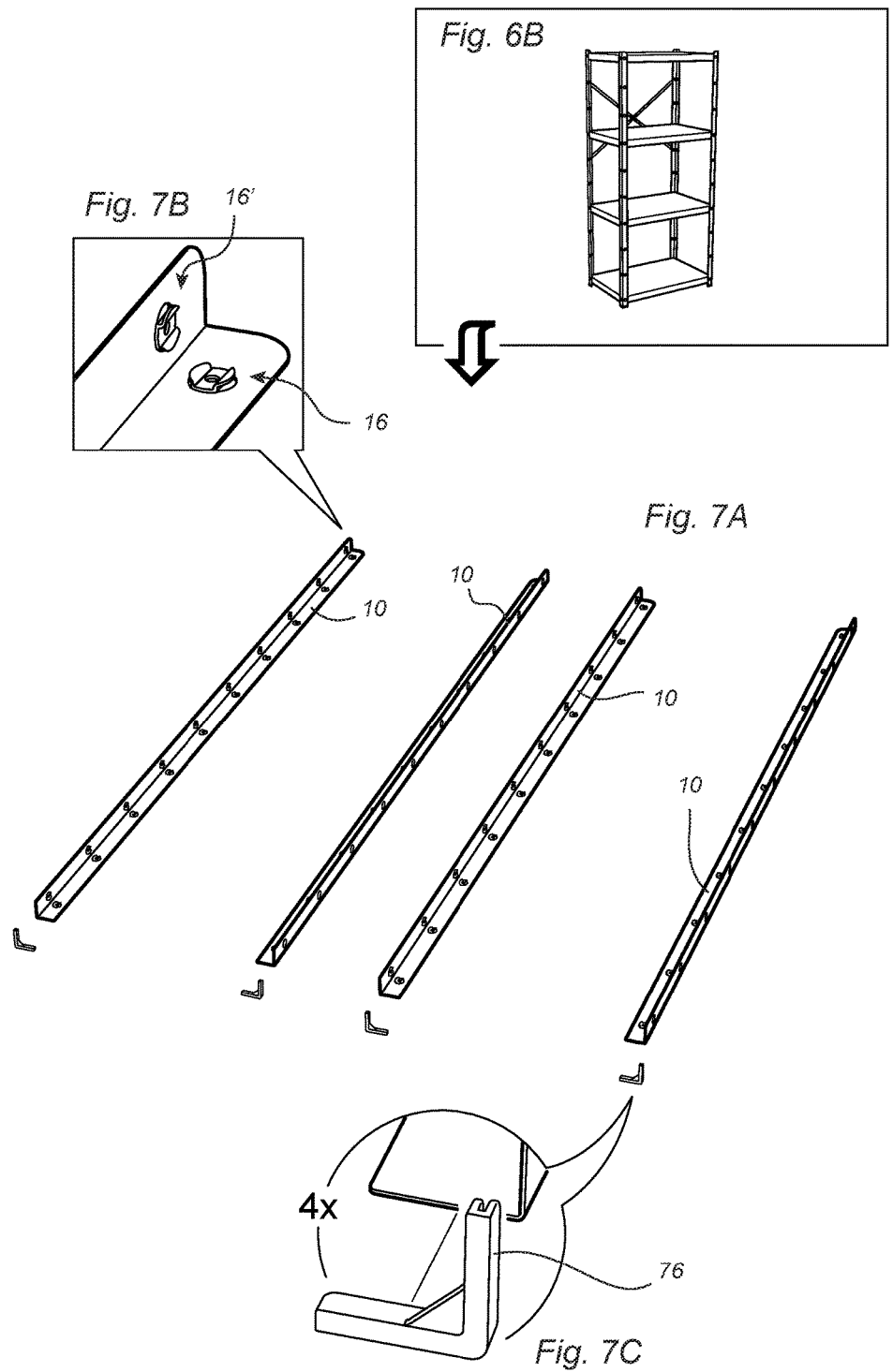

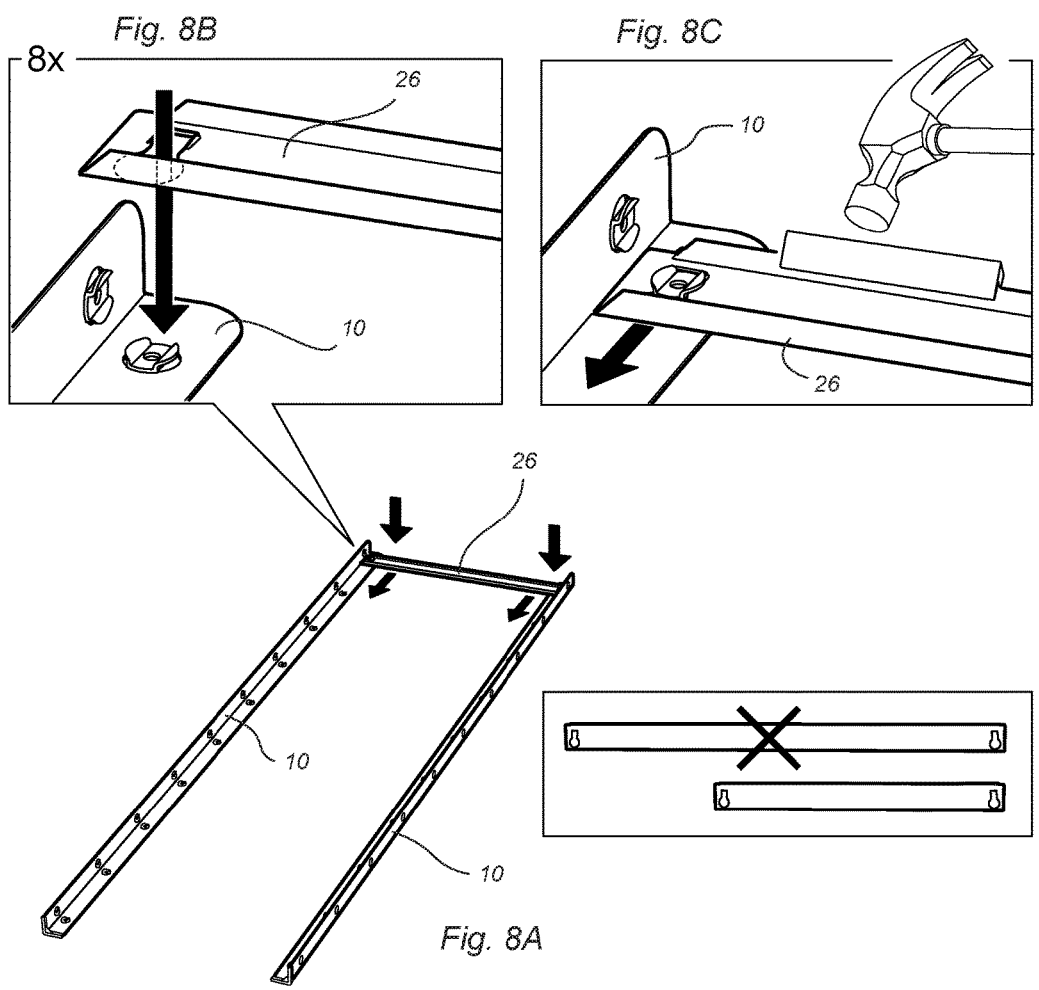

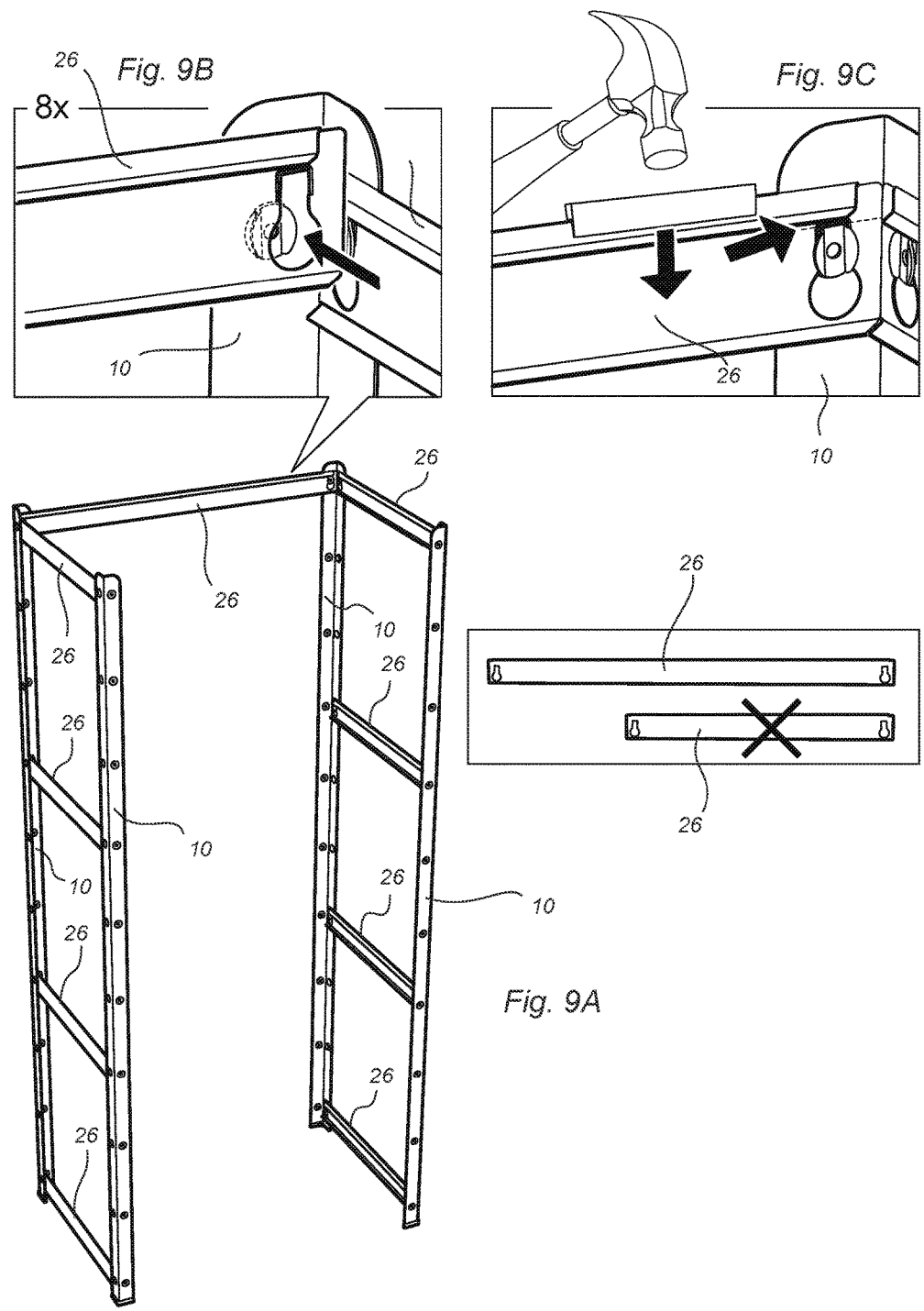

FURNITURE FRAME SYSTEM

FIELD OF THE INVENTION

The present invention relates to a furniture frame system.

BACKGROUND OF THE INVENTION

A piece of furniture often comprises structural elements, such as various kinds of beams, which are joined together to form a furniture frame. The furniture frame may be visible, such as in the case of e.g. a typical storage shelf. The furniture frame may also be partly or completely hidden by various functional or design elements, as is typically the case for e.g. an upholstered sofa. There is a need for a furniture frame system which is easy to assemble, and which provides a high mechanical strength.

SUMMARY OF THE INVENTION

It is an object of the present invention to solve, or at least mitigate, parts or all of the above mentioned problems. To this end, there is provided a furniture frame system comprising a first sheet metal beam extending along a first beam axis and having, as seen in a cross-section perpendicular to said first beam axis, an L-shaped cross-section portion comprising a first leg and a second leg, wherein an inner face of the first leg meets an inner face of the second leg at a leg angle, the inner face of said first leg comprising a first connector interface; and a second sheet metal beam extending along a second beam axis and comprising an axial end, the axial end having an axial end edge which forms a beam connection angle with the second beam axis, the axial end further comprising a second connector interface configured to mate with said first connector interface to connect said first and second sheet metal beams together such that said beam connection angle is formed between said first beam axis and said second beam axis, wherein one of said first and second connector interfaces is a male connector interface, the male connector interface comprising a male connector abutment face and a male connector extending from the male connector abutment face; the other of said first and second connector interfaces is a female connector interface, the female connector interface comprising a female connector abutment face configured to engage with and abut the male connector abutment face along an abutment plane, and, opposite the female connector abutment face, a locking face, wherein the female connector interface further comprises an attachment slot in said female connector abutment face, the attachment slot comprising an insertion opening configured to receive the male connector, and a slider engagement edge extending from the insertion opening; the male connector comprises a slot slider face configured to engage with and guide, or be guided by, the engagement edge of the attachment slot, and a locking edge extending along the male connector abutment face at a distance therefrom, the locking edge being configured to extend through the attachment slot to the locking face, to lock the male connector to the attachment slot in a direction normal to the abutment plane by engaging with the slider engagement edge at the locking face; a distance between the first connector interface and the inner face of the second leg of the first sheet metal beam corresponds to a distance between the second connector interface and the axial edge; and at least one of said slider engagement edge and said slot slider face defines a connector guide line for guiding the second connector along the abutment plane, which guide line is inclined relative to the axial end edge such that when moving the second connector interface along the first beam axis, the sliding engagement between the slot slider face and the slider engagement edge presses the axial end edge towards a firm abutment with the inner face of the second leg. Using such a furniture frame system, a very strong and rigid engagement between the beams may be obtained. Moreover, it may be assembled quickly and without any particular tools.

According to an embodiment, the male connector is arranged on the inner face of the first leg. Thereby, after assembly, the outer faces of the L-shape of the first beam will be free from any protruding portion of the male interface, which facilitates flush attachment to other structures, such as walls or other beams.

According to an embodiment, the beam connection angle is between 45° and 135°, for example, between 70° and 110°, such as about 90°. A typical beam connection angle in many furniture frame systems may be substantially perpendicular.

According to an embodiment, said guide line is inclined relative to the axial end edge by a guide line angle of between 1° and 5°, for example, between 2° and 4°. Guide line inclination angles within those intervals have been found to provide a good balance between ease of assembly and strength of the furniture frame.

According to an embodiment, said guide line has a substantially straight portion.

According to an embodiment, each of said slider engagement edge and said slot slider face are inclined by the same inclination angle to define said guide line. Thereby, the slider engagement edge and the slot slider face may experience a reduced load during assembly, which reduces the risk of damage to the furniture frame system during assembly.

According to an embodiment, the female connector interface comprises a first wedge extending from the locking face along the slider engagement edge and being configured to engage with the locking edge of the male connector to press, as the second connector is moved along the guide line, the female connector abutment face towards the male connector abutment face. Such a wedge increases the engagement force between the abutment faces of the female and male connector interfaces.

According to an embodiment, the female connector interface further comprises a second wedge extending from the locking face along a slot edge opposite the slider engagement edge, the second wedge being configured to engage with a locking edge of the male connector to press, as the second connector is moved along the guide line, the female connector abutment face towards the male connector abutment face. Such a second wedge even further increases the engagement force between the abutment faces of the female and male connector interfaces.

According to an embodiment, the first, and optionally, the second wedge is supported by a connection ridge extending from the locking face, which ridge may optionally join the first and second wedges. Such a ridge increases the mechanical strength of the female connector, and in particular increases the bending strength of the wedges. Optionally, said first and/or second wedges and/or connection ridge may be integrally formed with the beam. By way of example, said first and/or second wedges and/or connection ridge may be pressed from the sheet metal of the beam.

According to an embodiment, the male connector is provided with a through-hole at its center. Such a through-hole facilitates attaching auxiliary structures or objects to a furniture frame formed by the furniture frame system.

According to an embodiment, the male connector comprises a pair of opposite, parallel edges facing each other, the opposite parallel edges being configured to support a nut. This even further facilitates attaching auxiliary structures or objects to a furniture frame formed by the furniture frame system. For maximum support, the nut could be substantially rectangular, i.e. be provided with a pair of parallel long sides, and a pair of opposing short sides which may be parallel or non-parallel. Square should be seen as a special case of rectangular.

According to an embodiment, the male connector is integrally formed with the first beam. This is an efficient arrangement which reduces production costs.

According to an embodiment, the male connector is formed by punching a crescent-shaped slot, and pressing a tab defined by said slot to form said slot slider face and said locking edge. This further improves the strength of the furniture frame system.

According to an embodiment, the male connector comprises a pair of locking tabs extending in opposite directions, each locking tab being provided with a respective locking edge.

According to an embodiment, a central male connector portion between said pair of locking tabs is offset relative to the plane of the male connector interface abutment face. Such an out-of-plane offset increases the mechanical stability of the male connector interface. By way of example, the central male connector portion may be offset in a direction normal to the male connector abutment plane. This may e.g. allow for an increased thickness, and thereby strength, of the slider engagement edge. Moreover, e.g. any object screwed onto the face opposite to the male connector abutment face, via e.g. a screw hole through the male connector, will be firmly clamped to said opposite face.

According to an embodiment, a length of said axial end edge is at least 15 mm. Thereby, a very rigid connection may be obtained. Optionally, the length of said axial end edge may be at least 20 mm, at least 30 mm, or at least 40 mm.

According to an embodiment, said first and/or second sheet metal beam are/is formed of pressed steel sheet.

According to an embodiment, the attachment slot is shaped as an opening having one large opening part and one narrow opening part, e.g. the attachment slot may in particular have the shape of a keyhole.

According to embodiments, the leg angle may be less than 135°, less than 110°, less than 100°, or a substantially right angle.

According to an embodiment, the furniture frame is a storage shelf frame.

According to an embodiment, the inner face of said second leg comprises a third connector interface, and the furniture frame system further comprises a third sheet metal beam extending along a third beam axis and comprising an axial end, the axial end having an axial end edge which forms a beam connection angle with the third beam axis, the axial end further comprising a fourth connector interface configured to mate with said third connector interface to connect said first and third sheet metal beams together such that said beam connection angle is formed between said first beam axis and said third beam axis, wherein one of said third and fourth connector interfaces is a male connector interface, the male connector interface comprising a male connector abutment face and a male connector extending from the male connector abutment face; the other of said third and fourth connector interfaces is a female connector interface, the female connector interface comprising a female connector abutment face configured to engage with and abut the male connector abutment face along an abutment plane, and, opposite the female connector abutment face, a locking face, wherein the female connector interface further comprises an attachment slot in said female connector abutment face, the attachment slot comprising an insertion opening configured to receive the male connector, and a slider engagement edge extending from the insertion opening; the male connector comprises a slot slider face configured to engage with and be guided by the engagement edge of the attachment slot, and a locking edge extending along the male connector abutment face at a distance therefrom, the locking edge being configured to extend through the attachment slot to the locking face, to lock the male connector to the attachment slot in a direction normal to the abutment plane by engaging with the slider engagement edge at the locking face; a distance between the third connector interface and the inner face of the first leg of the first sheet metal beam corresponds to a distance between the fourth connector interface and the axial edge of the third beam; and at least one of the slider engagement edge and the slot slider face of the third and fourth connector interfaces defines a connector guide line for guiding the fourth connector along the abutment plane, which guide line is inclined relative to the axial end edge such that when moving the fourth connector interface along the first beam axis, the sliding engagement between the slot slider face and the slider engagement edge presses the axial edge towards a firm abutment with the inner face of the first leg. Such a furniture frame system allows forming more complex furniture frames. The third and fourth connector interfaces may be configured in accordance with any of the embodiments described with reference to the first and second connector interfaces.

According to another aspect, there is provided a storage shelf assembly comprising a furniture frame system as defined hereinabove.

It is noted that embodiments of the invention may be embodied by all possible combinations of features recited in the claims.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 5D and 5E are perspective views illustrating intermediate stages of connecting a third beam to the beam assembly of FIG. 5C;

FIG. 6B is a perspective view of the storage shelf assembly of FIG. 6A, as seen from a slightly different perspective;

FIG. 7A is a perspective view of four support beams and four feet, the view illustrating a first intermediate stage of assembly of the storage shelf assembly of FIG. 6B;

FIG. 7B is a detail view of a portion of one of the support beams of FIG. 7A;

FIG. 7C is a detail view of a portion of one of the feet and one of the support beams of FIG. 7A, illustrating the attachment of the foot to the support beam;

FIG. 8A is a perspective view of a pair of the support beams of FIG. 7A, the view illustrating a second intermediate stage of assembly of the storage shelf assembly of FIG. 6B wherein a set of relatively shorter support beams are attached to the pair of beams, wherein eight relatively shorter carrier beams in total are attached to two pairs of support beams to form two ladder structures;

FIG. 8B is a detail view of a first step of attaching an end of a carrier beam to a support beam;

FIG. 8C is a detail view of a second step of attaching the end of the carrier beam of FIG. 8B to the support beam;

FIG. 9A is a perspective view of the ladder structures obtained in the steps illustrated in FIGS. 8A-C, the view illustrating a third intermediate stage of assembly of the storage shelf assembly of FIG. 6B wherein a set of relatively longer support beams are attached to the ladder structures to join them together, wherein eight relatively longer carrier beams in total are attached to the two ladder structures to form a shelf support structure;

FIG. 9B is a detail view of a first step of attaching an end of a carrier beam to a support beam of a ladder structure;

FIG. 9C is a detail view of a second step of attaching the end of the carrier beam of FIG. 9B to the support beam of the ladder structure;

FIG. 10B is a detail view of the shelf support structure obtained following the steps illustrated in FIGS. 9A-C, the view together with FIG. 10C illustrating a fourth intermediate stage of assembly of the storage shelf assembly of FIG. 6B, wherein the steps of FIGS. 10B and 10C are repeated four times to attach four central shelf supports to the shelf support structure, wherein FIG. 10B illustrates a first step of attaching a central shelf support to the shelf support structure, and FIG. 10C corresponds to the view of FIG. 10B and illustrates a second step of attaching the central shelf support to the shelf support structure;

Figure 1:
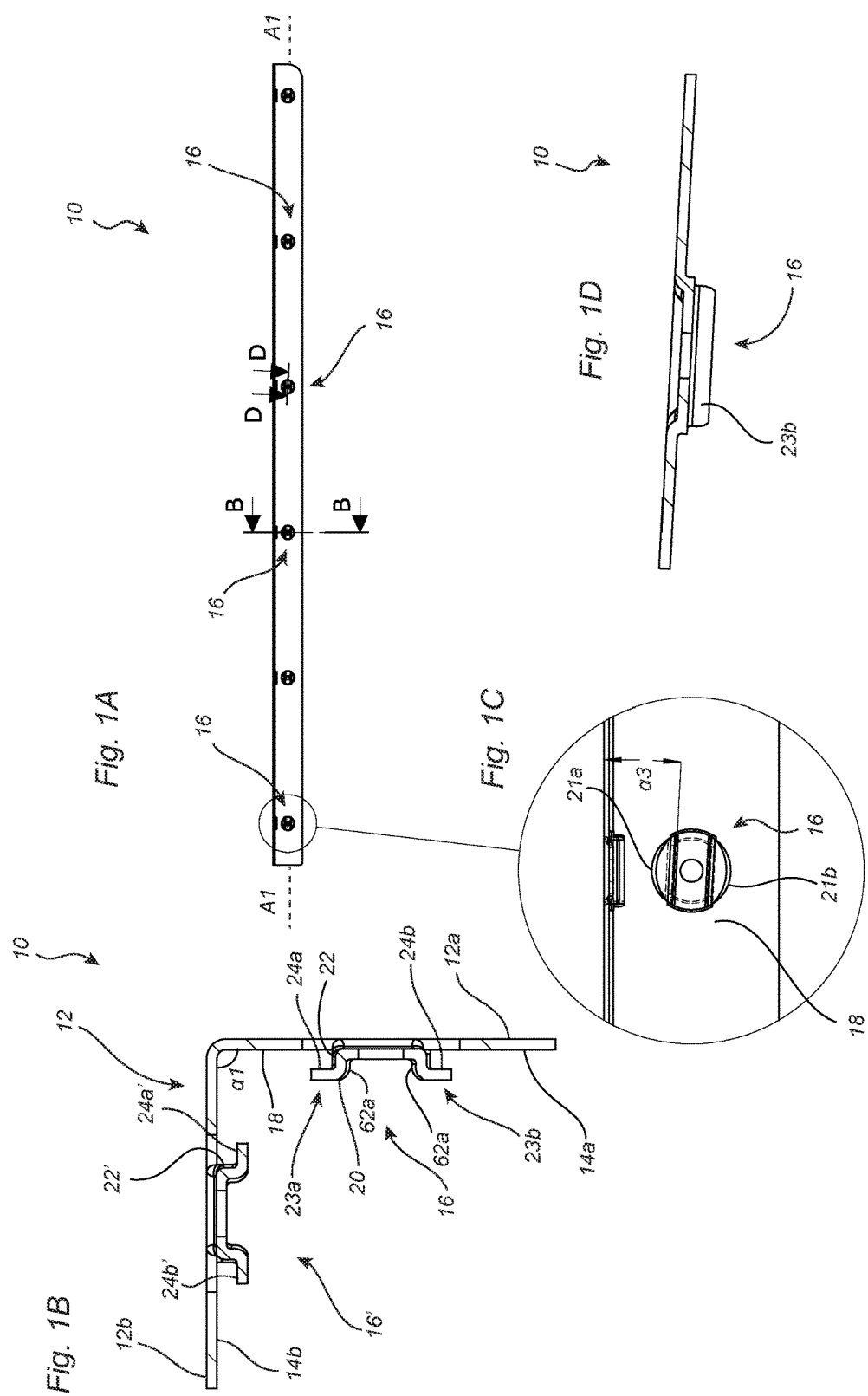
FIG. 1A presents a plan view of a first sheet metal beam.
FIG. 1B illustrates a cross-section of the first sheet metal beam of FIG. 1A, taken along the line B-B.
FIG. 1C is a detail view of a first connector interface, of the first sheet metal beam of FIG. 1A.
FIG. 1D illustrates a cross-section of the first sheet metal beam of FIG. 1A, taken along the line D-D.
Figure 2:
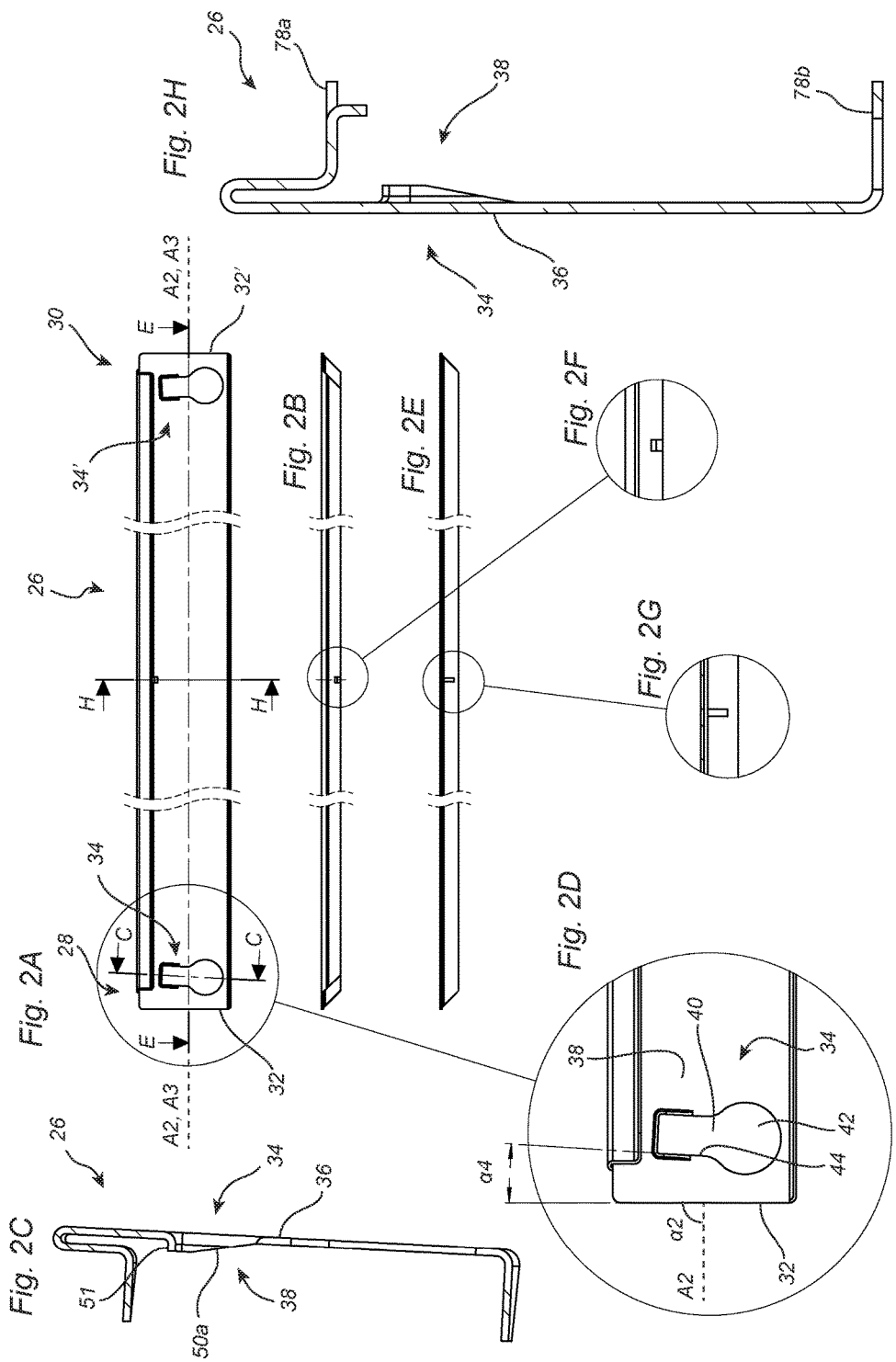
FIG. 2A is a first plan view of a second sheet metal beam, as seen from the side.
FIG. 2B is a second plan view of the second sheet metal beam of FIG. 2A, as seen from above.
FIG. 2C is a cross-section of the second sheet metal beam of FIG. 2A, taken along the line C-C.
FIG. 2D is a detail view of a second connector interface, of the second sheet metal beam of FIG. 2A.
FIG. 2E is a cross-section of the second sheet metal beam of FIG. 2A, taken along the line E-E.
FIG. 2F is a magnified detail of the view of FIG. 2B.
FIG. 2G is a magnified detail of the cross-section of FIG. 2E.
FIG. 2H is a cross-section of the second sheet metal beam of FIG. 2A taken along the line H-H.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

FIGS. 1A-D illustrate a first sheet metal 10 beam in a plan view, in two sections B-B and D-D of the plan view, and in a detail view of a male connector of the first beam 10. The first sheet metal beam 10 is integrally formed of pressed steel sheet. The first sheet metal beam 10, which is configured to form part of a furniture frame system (not illustrated), extends along a first beam axis A1 and has, as seen in a cross-section B-B perpendicular to said first beam axis A1, an L-shaped cross-section portion 12 comprising a first leg 12a and a second leg 12b. An inner face 14a of the first leg 12a meets an inner face 14b of the second leg 12b at an angle α1 of less than 100°, and the inner face 14a of said first leg 12a comprises a first connector interface 16.

The first connector interface 16 is configured as a male connector interface comprising a flat male connector abutment face 18, and a male connector 20 extending from the male connector abutment face 18. The male connector 20 comprises a slot slider face 22, and a pair of locking edges 24a, 24b extending along the male connector abutment face 18 at a distance therefrom. The slot slider face 22 as well as the locking edges 24a, 24b are formed by a pair of locking tabs 23a, 23b extending in opposite directions, each locking tab 23a, 23b being provided with a respective locking edge 24a, 24b. The male connector 20 is integrally formed with the first beam 10 by punching a pair of opposing, crescent-shaped slots 21a, 21b, and pressing the tabs defined by said slots 21a, 21b to form said locking tabs 23a, 23b defining said slot slider face 22 and said locking edges 24a, 24b.

The slot slider face 22 follows a substantially straight line, and forms an angle α3 of about 3° with the first beam axis A1. Several similar connector interfaces 16 are distributed along the length of the first beam 10.

FIGS. 2A-H illustrate a second sheet metal beam 26. The second sheet metal beam 26 is integrally formed of pressed steel sheet. The second sheet metal beam 26, which is configured to be connected to the first sheet metal beam 10 (FIG. 1) to form part of said furniture frame system, extends along a second beam axis A2 and comprises a first axial end 28 and a second axial end 30, which is identical to the first axial end 28 albeit in a mirrored configuration. The first axial end 28 has an axial end edge 32 which forms a beam connection angle α2 with the second beam axis A2. The axial end further comprises a second connector interface 34 configured to mate with said first connector interface 16 to connect said first and second sheet metal beams 10, 26 together such that said beam connection angle α2 is formed between said first beam axis A1 and said second beam axis A2 in a manner which will be elucidated further below. The beam connection angle α2 which will be illustrated in the following is 90°, but may typically be anywhere between 45° and 135°, for example, between 70° and 110°.

The second connector interface 34 is configured as a female connector interface, and comprises a flat female connector abutment face 36 configured to engage with and abut the male connector abutment face 18 along an abutment plane, and, opposite the female connector abutment face 36, a locking face 38. The female connector interface further comprises an attachment slot 40 in said female connector abutment face 36, the attachment slot 40 comprising an insertion opening 42 configured to receive the male connector 20 of the first beam 10, and a slider engagement edge 44 extending from the insertion opening 42. In the illustrated embodiment, the attachment slot 40 is shaped as a keyhole, but it may have any other suitable shape.

The slider engagement edge 44 follows a substantially straight line, and forms an angle α4 of about 3° with the axial end edge 32.

As will be elucidated in the following, the slot slider face 22 (FIG. 1B) is configured to engage with and guide, or be guided by, the engagement edge 44 of the attachment slot 40. The locking edges 24a, 24b (FIG. 1B) of the male connector 20 are configured to extend through the attachment slot 40 to the locking face 38, to lock the male connector 20 to the attachment slot 40 in a direction normal to the abutment plane (as defined by the engaging abutment faces 18, 36) by engaging with the slider engagement edge 44 at the locking face 38.

Figure 3:
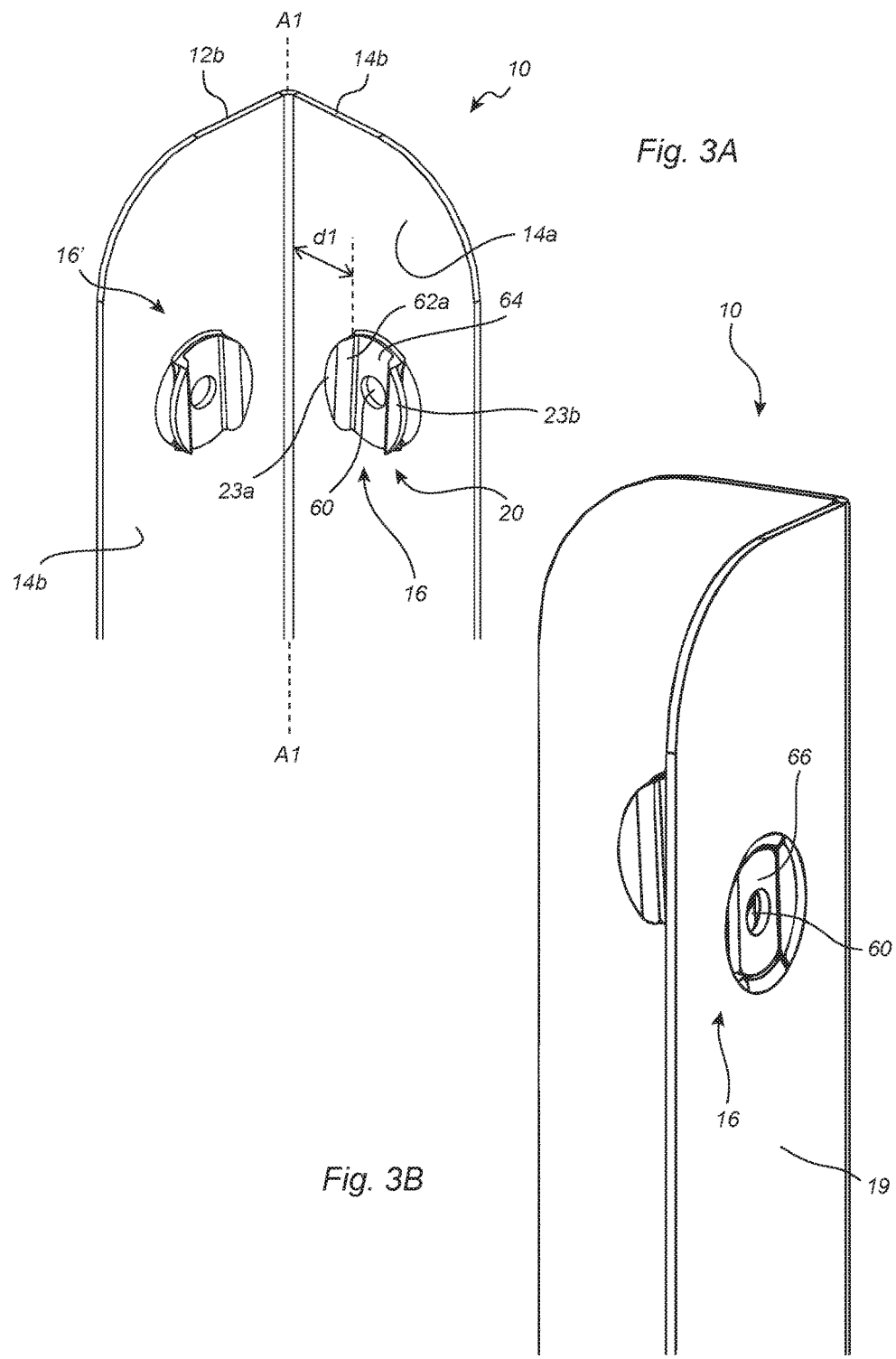
FIG. 3A illustrates an end portion of the first sheet metal beam of FIG. 1 in a first perspective.
FIG. 3B illustrates the sheet metal beam end portion of FIG. 3A in a second perspective.

FIGS. 3A, 3B illustrates the first, male, connector interface 16 of the first beam 10 in somewhat greater detail, and from two different perspectives. The male connector 20 is provided with a through-hole 60 at its center. Referring back to FIG. 1, a pair of opposite, parallel edges 62a, 62b face each other, and are configured to support a rectangular nut (not illustrated). The edges 62a, 62b are defined by inner edges of the locking tabs 23a, 23b. A central male connector portion 64 between said pair of locking tabs 23a, 23b is offset, and in the illustrated example, raised relative to the male connector interface abutment face 18. As the male connector 20 is integrally formed of the pressed steel sheet of the beam 10, a corresponding depression 66 is formed on the back side 19 of the first beam 10. A third connector interface 16' is formed on the second inner face 14b of the second leg 12b of the first beam 10. The third connector interface 16' is a male connector interface identical to the first connector interface 16, albeit in a mirrored configuration to mate with a fourth connector interface 34' (FIG. 2A) of e.g. the second beam 26 in a manner which will be described further below.

A distance d1 is formed between the first connector interface 16 and the inner face 14b of the second leg 12b of the first sheet metal beam 10. More particularly, in the illustrated embodiment, the distance d1 is the distance between the slot slider face 22 (FIG. 1B) of the male connector 20 and the inner face 14b of the second leg 12b of the first sheet metal beam 10.

Figure 4:
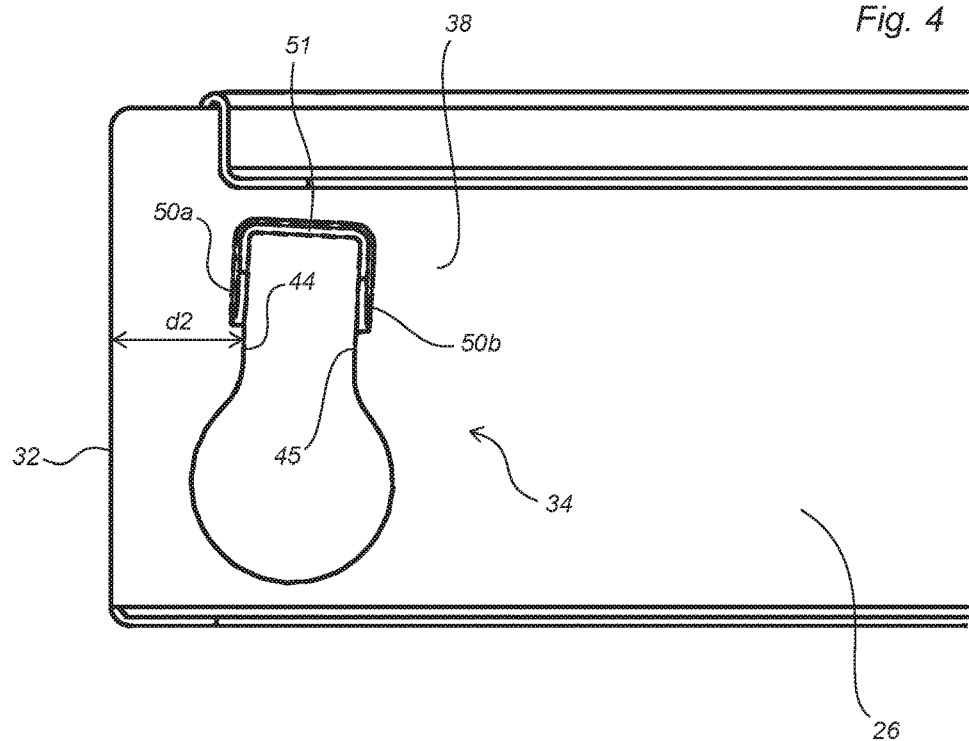
FIG. 4 is a plan view of an end portion of the second sheet metal beam of FIG. 2.

FIG. 4 illustrates the second, female, connector interface 34 of the second sheet metal beam 26 in greater detail. A distance d2 is formed between the second connector interface 34 and the axial edge 32 of the second sheet metal beam 26. More particularly, in the illustrated embodiment, the distance d2 is the distance between the slider engagement edge 44 and the axial edge 32. A first wedge 50a extends from the locking face 38 along the slider engagement edge 44, and is configured to engage with the locking edge 24a of the male connector 20. A second wedge 50b extends from the locking face 38 along a slot edge 45 opposite the slider engagement edge 44, the second wedge being configured to engage with the locking edge 24b of the male connector 20. The first and second wedges 50a, 50b are joined by a connection ridge 51 extending from the locking face 38.

FIG. 5A-5E illustrate intermediate steps of assembly of a furniture frame using the first and second sheet metal beams 10, 26, as well as a third sheet metal beam 26', which may be identical to the second sheet metal beam 26.

Figure 5A:
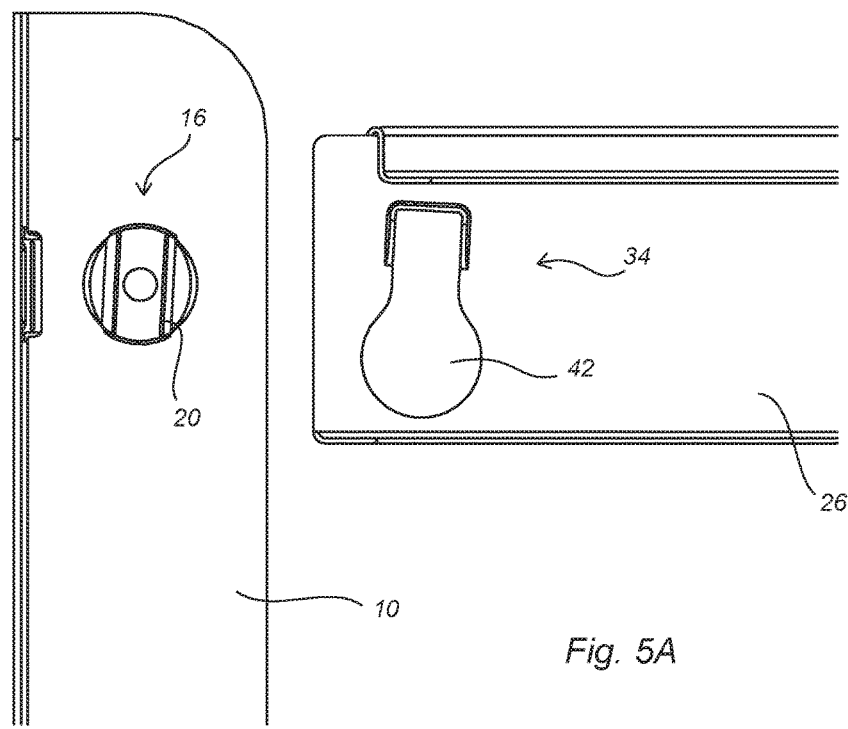
FIGS. 5A-5C are plan views illustrating intermediate stages of assembly of the first and second beams of FIGS. 1 and 2.
Figure 5B:
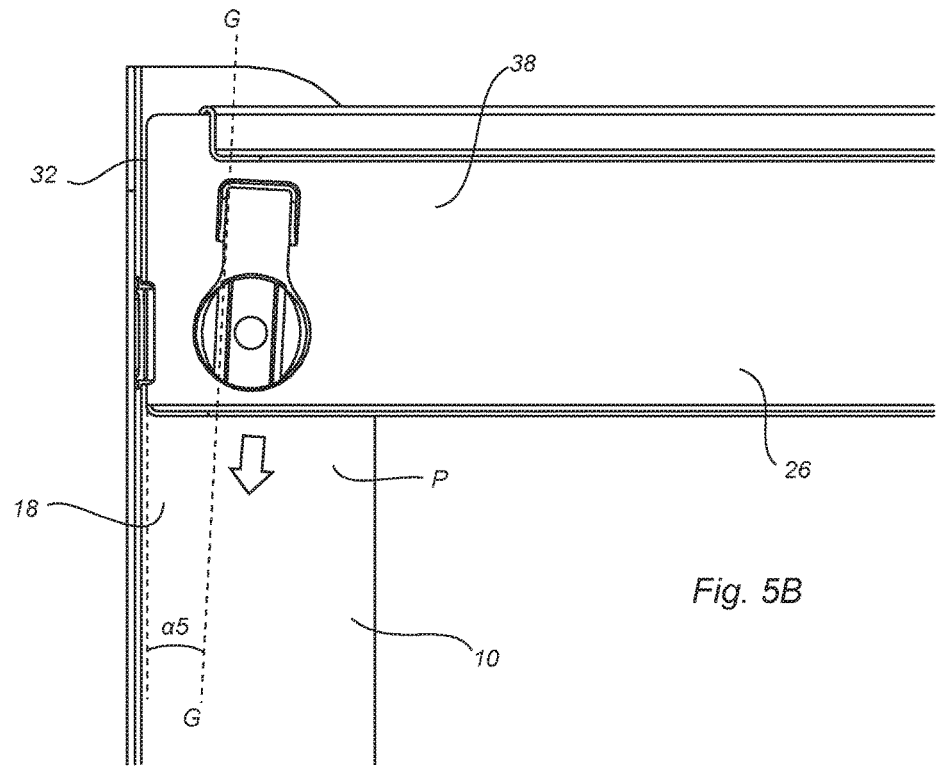

In FIG. 5A, the second sheet metal beams 10 is moved along the arrow such that the male connector 20 is positioned in register with the insertion opening 42. Thereafter, the male connector abutment face 18 (FIG. 1B) is brought into abutment with the female connector abutment face 36, and the male connector 20 penetrates through the insertion opening 42. In the position of FIG. 5B, the abutment faces 18, 36 abut along an abutment plane P defined by the plane of their mutual engagement, and the locking edges locking edges 24a, 24b are positioned on the locking face side of the second beam 26.

Figure 5C:
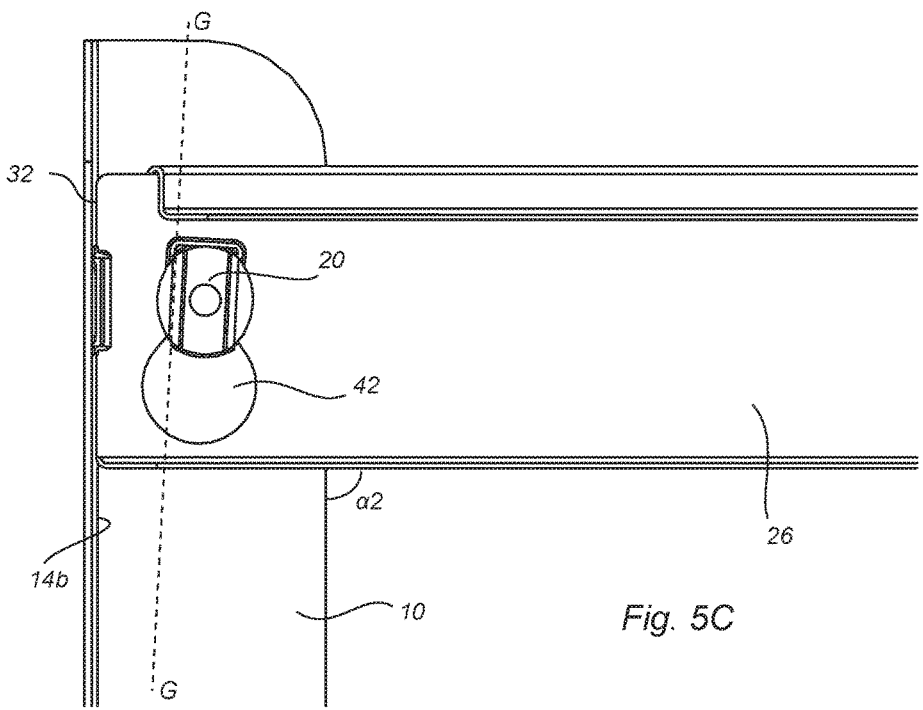

Moving from the situation of FIG. 5B to the situation of FIG. 5C, the second beam 26 is moved downwards along the arrow of FIG. 5B. Together, the inclined slider engagement edge 44 (FIG. 2D) and slot slider face 22 (FIG. 1B) define an inclined connector guide line G, along which the second connector 34 is guided in the abutment plane P. The guide line G forms a guide line angle α5 with the first beam axis A1 (FIG. 1A) as well as with the axial end edge 32 of the second beam 26, and with the inner face 14b of the second leg 12b of the first beam 10. The guide line angle α5 is determined by the angles α3 and α4 of the slot slider face 22 of the male connector 20 (FIG. 1B) and the slider engagement edge 44 of the female connector interface 34. In alternative embodiments, the path shape of the guide line, and the guide line angle α5 along the guided path, may be determined by respective shapes of the slider engagement edge 44 and slot slider face 22. The illustrated guide line angle α5 is about 3°, but may typically be anywhere between 1° and 5°, for example, between 2° and 4°.

Referring back to FIGS. 3A-B and 4, the distance d2 corresponds to the distance d1 in such a manner that when pressing the second beam 26 downwards as illustrated in FIG. 5B, the inclined sliding engagement between the slot slider face 22 and the slider engagement edge 44 presses the axial end edge towards a firm abutment with the inner face 14b of the second leg 12b.

During the sliding motion between FIG. 5B and FIG. 5C, the wedges 50a, 50b (FIG. 4) gradually engage with the locking edges 24a, 24b (FIG. 1B) of the male connector 20, and press, as the female connector interface 34 is moved along the guide line G, the female connector abutment face 36 against the male connector abutment face 18. Intrinsic resilience of the locking tabs 23a, 23b maintains a well-defined engagement pressure between the abutment faces 18, 36 throughout the motion. The height of the wedges 50a, 50b approximately corresponds to, or is slightly greater than, the distance between the male connector's engagement edges 24a, 24b and the male connector abutment face 18. In the position of FIG. 5C, the axial end edge 32 of the second beam 26 is biased against the inner face 14b of the second leg 12b (FIG. 1B) of the first beam 10 by intrinsic resilience of the steel sheet material of the male connector 20 as well as of the second leg 12b, and hence, a firm abutment will be maintained. The long line of engagement between the axial end edge 32 of the second beam 26 and the inner face 14b of the second leg 12b of the first beam 10 warrants a high stability of the beam connection angle α2, even under heavy load. Even though defined as the angle between the beam axes A1, A2, for reasons of simplicity, the beam connection angle α2 is in FIG. 5C illustrated as the angle between longitudinal edges of the first and second beams 10, 26. A typical length of the axial end edge 32 of the second beam 26 may be at least 15 mm, and more typically, at least 30 mm.

Turning now to FIG. 5D, the inner face 14b of said second leg 12b comprises a third connector interface 16' which, as has been mentioned hereinbefore, is a male connection interface. The third connector interface is configured for connecting to a third sheet metal beam 26', which may be identical to the second sheet metal beam 26, and the details of which are apparent from e.g. FIGS. 2A-H. The third beam 26' extends along a third beam axis A3 and comprises an axial end 30, the axial end 30 having an axial end edge 32' which forms a beam connection angle α6 with the third beam axis A3. The axial end 30 further comprising a fourth connector interface 34' (FIG. 2A) configured to mate with said third connector interface 16, to connect said first and third sheet metal beams 10, 26, together such that said beam connection angle α6 is formed between said first beam axis A1 and said third beam axis A3. The fourth connector interface 34' is a female connector interface which may be identical to the second connector interface 34, albeit in a mirrored configuration.

As is illustrated in FIG. 5D, the third beam 26b' is configured to be connected to the first beam 10 in the same manner as the second beam 26, by sliding the fourth connector interface 34' relative to the third connector interface 16' along a guide line G' which is inclined relative to the axial end edge 32', as well as relative to the first beam axis A1 and the inner face 14a of the first leg 12a of the first beam 10. The guide line G' forms a guide line angle α7 with the axial end edge 32' of the third beam 26, of about 3°, but may typically be anywhere between 1° and 5°, for example, between 2° and 4°.

Upon pressing the third beam 26' downwards in the direction illustrated by an arrow in FIG. 5D, the inclined, sliding engagement between the third and fourth connector interfaces 16', 34' presses the axial end edge 32' towards a firm abutment with the locking face 38 of the second beam 26. Even though not necessary, the distance between the fourth connector interface 34' and the axial end edge 32' of the third beam 26' may be somewhat adjusted to compensate to the reduced distance between the third connector interface 16' and the inner face 14a of the first leg 12a of the first sheet metal beam 10 due to the thickness of the second beam 26.

After having pressed the third beam 26' into its final position illustrated in FIG. 5E, all three beams 10, 16, 16' form right angles with each other.

Figure 6A:
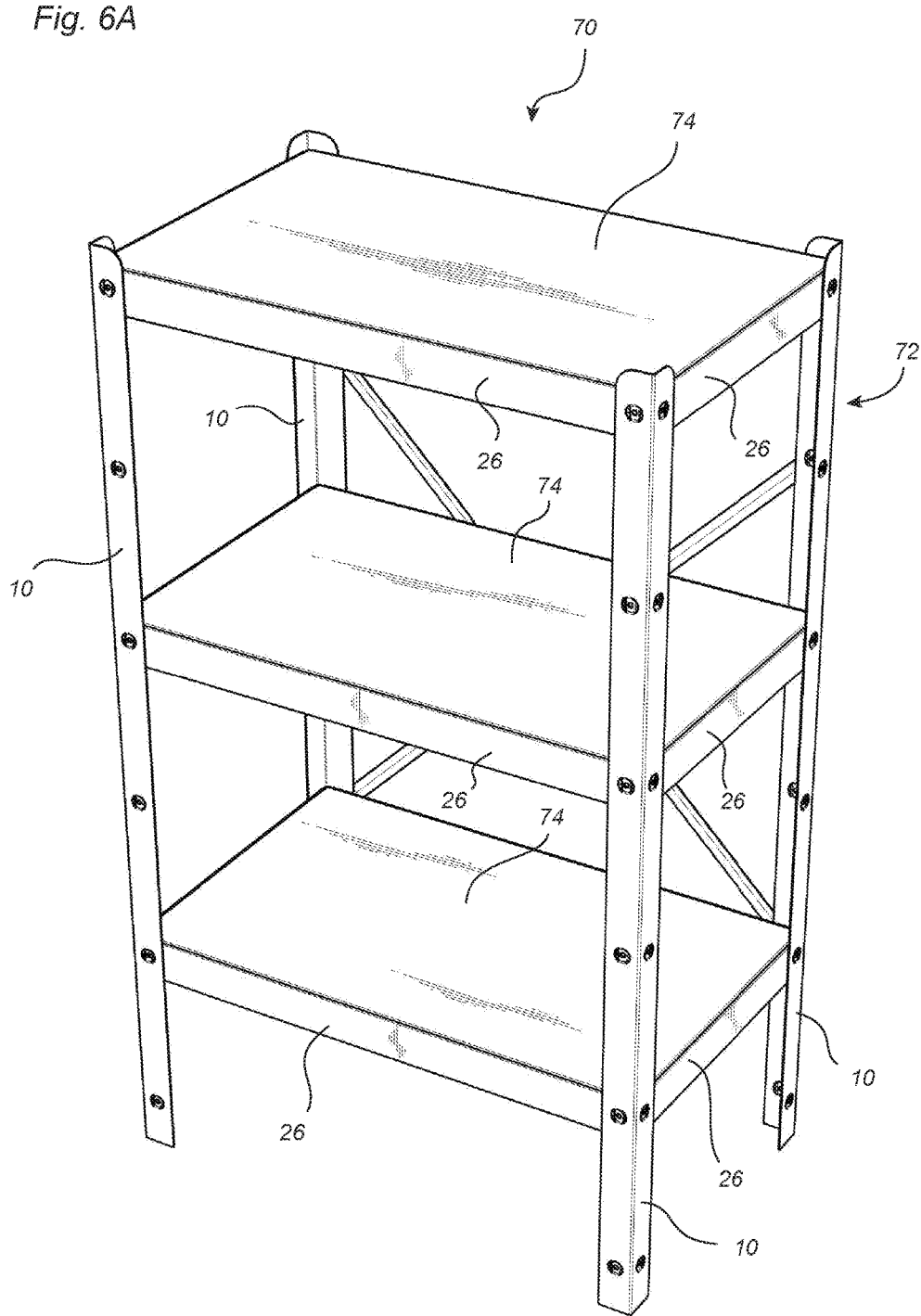
FIG. 6A is a perspective view of a storage shelf assembly formed by multiple instances of the first and second beams of FIGS. 1 and 2.

FIG. 6A illustrates a storage shelf assembly 70 comprising a storage shelf frame 72, and a set of storage shelves 74 carried by the storage shelf frame 72. The storage shelf frame 72 comprises a set of four vertical support beams 10, each support beam 10 being configured in accordance with the first beam 10 disclosed hereinabove, and a set of horizontal carrier beams 26, each carrier beam configured in accordance with the second (or third) beam 26 disclosed hereinabove. The carrier beams 26 interconnect the support beams 10 in, as seen from above, a rectangular configuration. Each shelf 74 is carried by four carrier beams 26 rectangularly arranged between the support beams 10. Each carrier beam 26 is connected between a pair of support beams 10 in the manner, and using the connection interfaces 16, 16', 34, 34' disclosed in detail hereinabove.

Figure 14A:
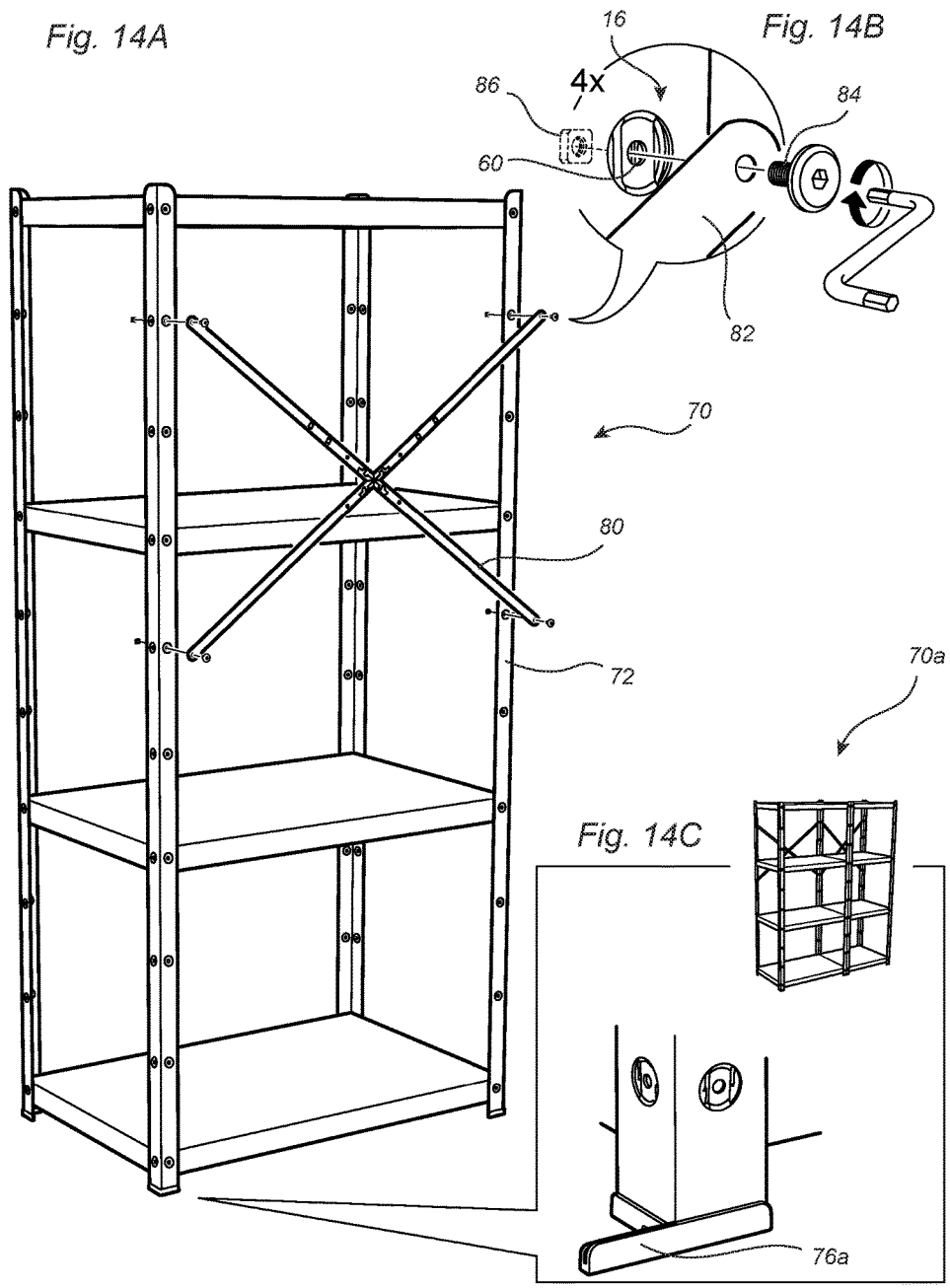
FIG. 14A is a perspective view illustrating the attachment of the cross-brace assembled following the step illustrated in FIG. 13A to the shelf structure formed following the step illustrated in FIG. 11 to form the storage shelf assembly of FIG. 6B.
Figure 14B:
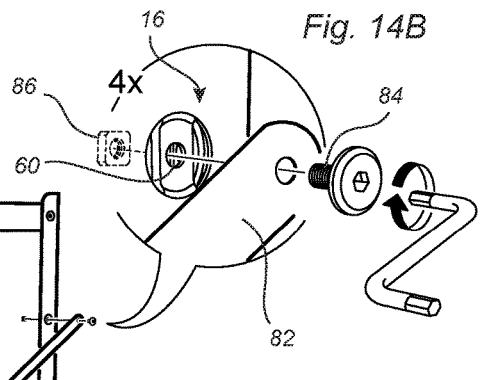
FIG. 14B is a magnified view of the view of FIG. 14A.
Figure 14C:
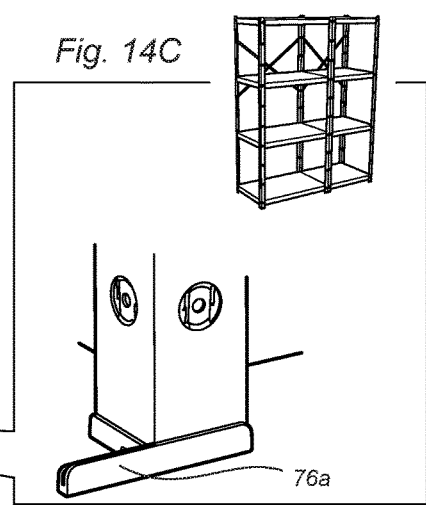
FIG. 14C is a magnified view of the view of FIG. 14A, and illustrates the optional use of an extension foot for forming an extended storage shelf assembly.
Figure 15:
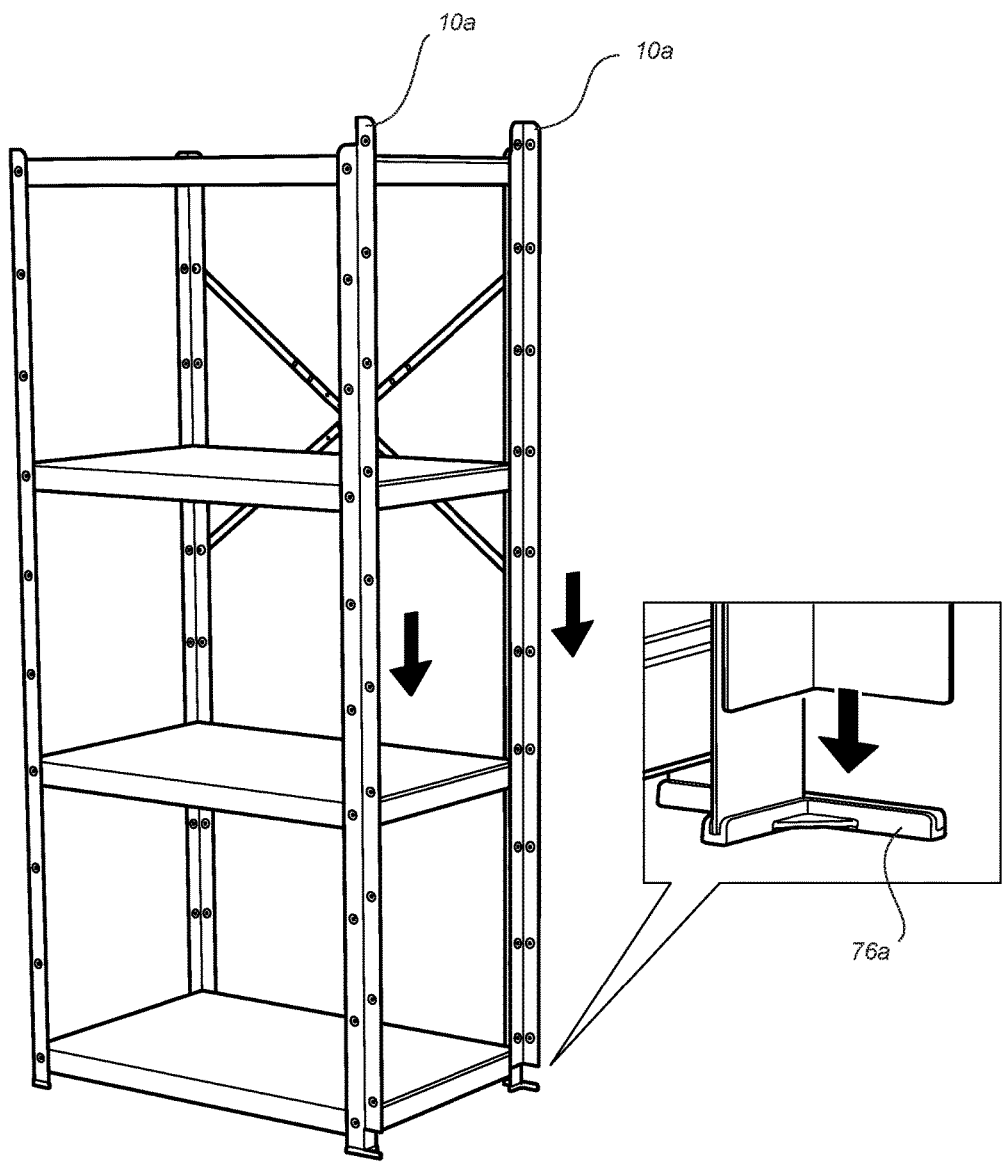
FIGS. 15-16 are perspective views of the storage shelf assembly of FIG. 6B, and illustrate intermediate stages of extending the storage shelf assembly of FIG. 6B to form an extended storage shelf assembly.
Figure 16:
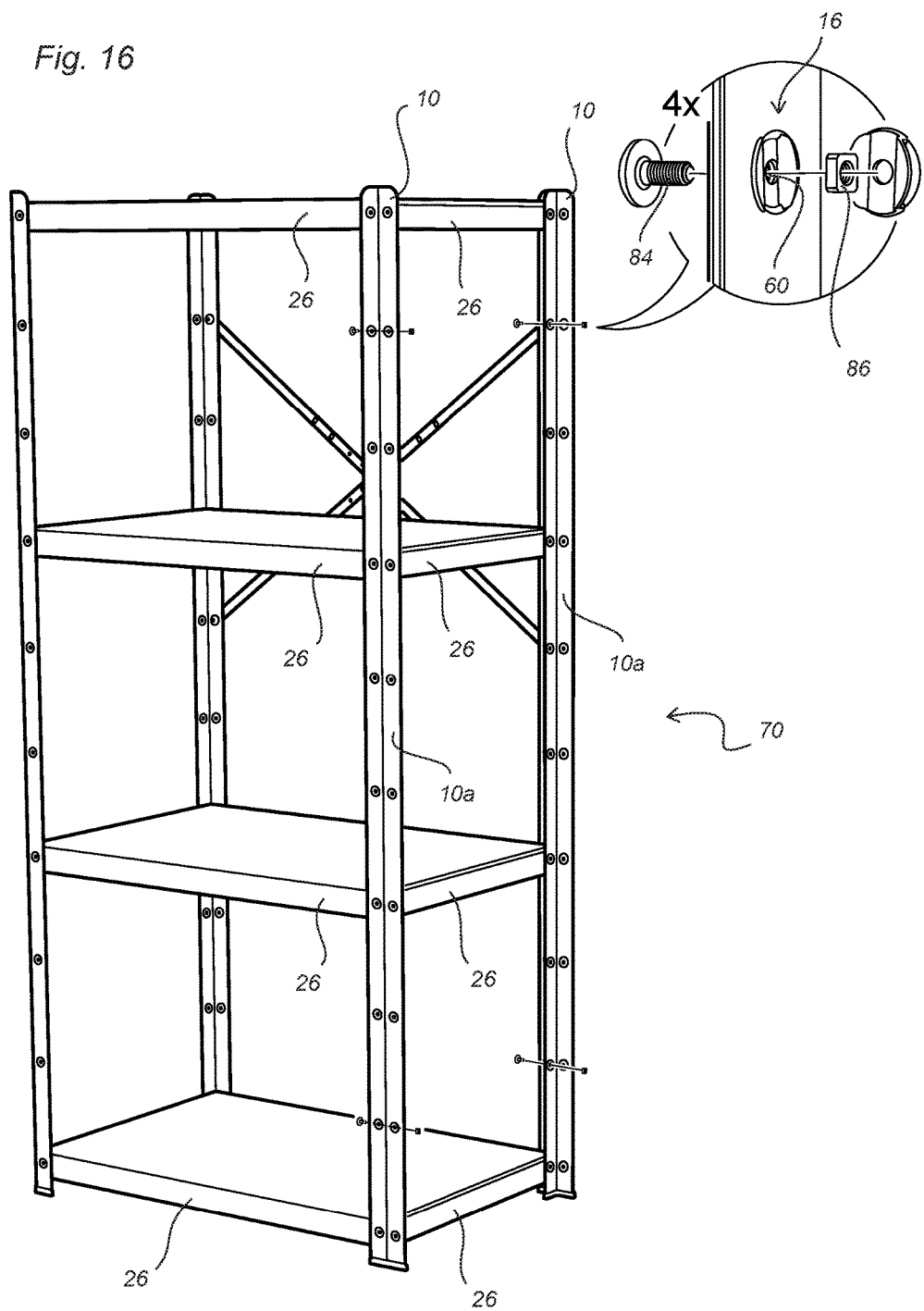

FIGS. 7A-14C illustrate the assembly of the storage shelf 70, whereas FIGS. 15-16 illustrate the extension of the storage shelf 70 to form an extended storage shelf 70a (FIG. 14C).

Starting with FIGS. 7A-C, four support beams 10 are provided, each comprising a set of male connector interfaces 16, 16'. Feet 76 are attached to a bottom end of the support beams 10.

In FIGS. 8A-C, carrier beams 26 are attached to the support beams 10 following the method, and using the connection interfaces 16, 16', 34, 14' described in detail hereinabove. The carrier beams 26 may be struck by a hammer to easier obtain a high force for pressing the female connector interfaces 34, 34', of the carrier beams 26 along the respective guide lines G, G'.

In FIGS. 9A-C, additional carrier beams 26 are attached between the support beams 10 in the same manner.

Figure 10A:
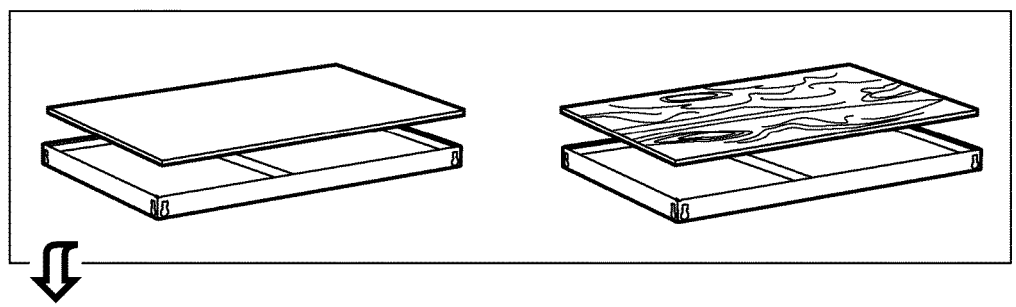
FIG. 10A is a perspective view illustrating two different types of shelves that may be carried by the shelf support structure obtained following the steps illustrated in FIGS. 9A-C.
Figure 10B:
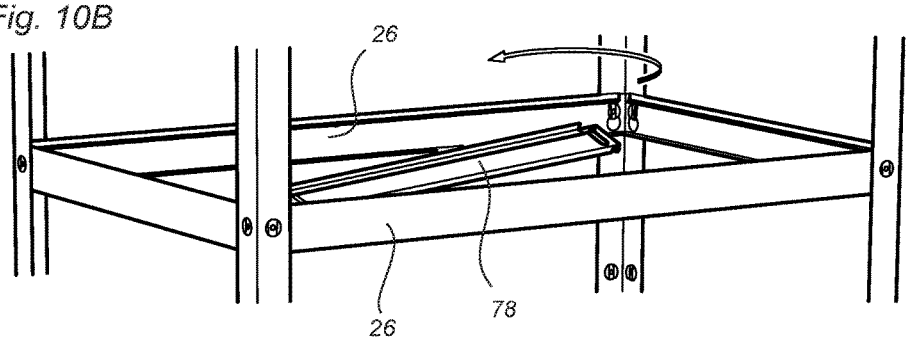
Figure 10C:
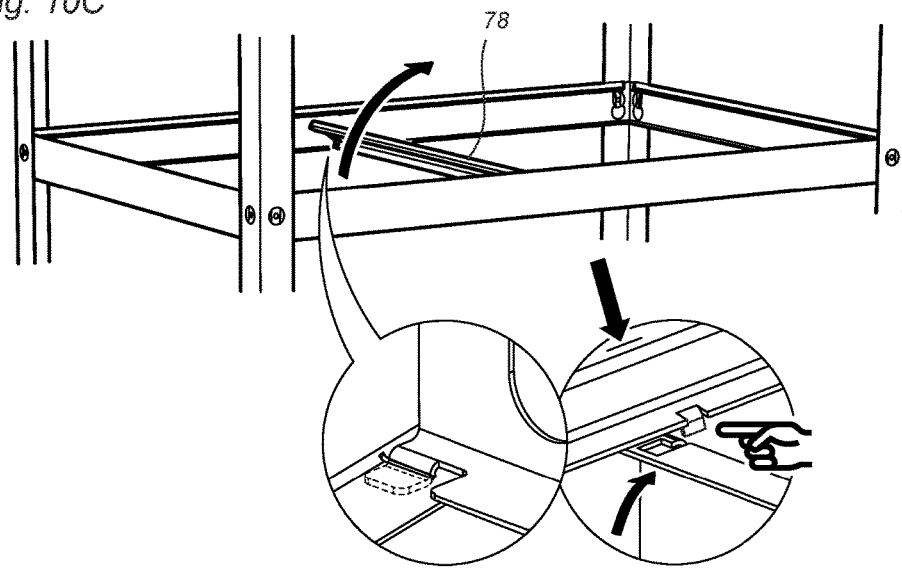

In FIGS. 10B-C, a central shelf support beam 78 is attached between a pair of parallel support beams 26 in a manner unrelated to the present invention.

Figure 11:
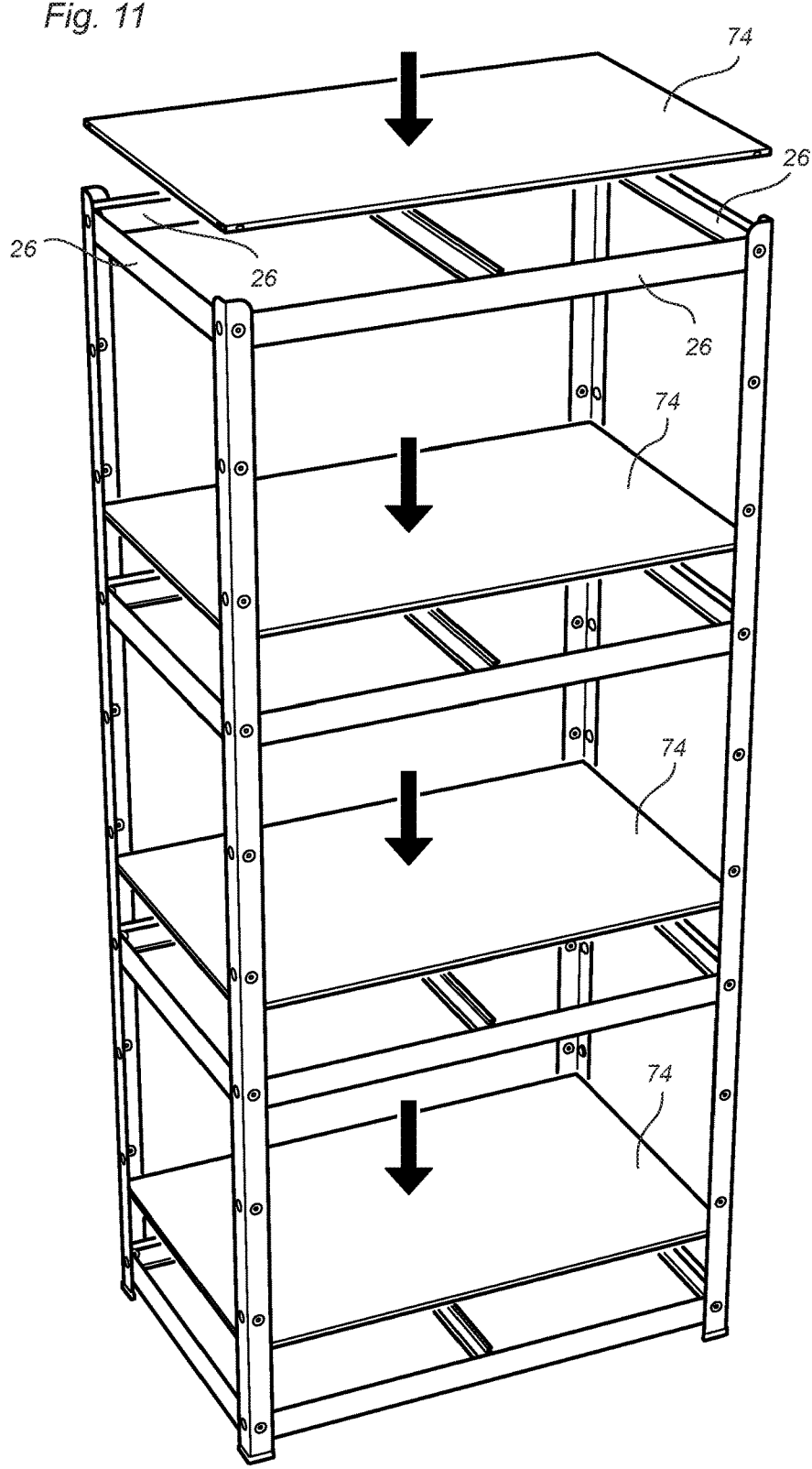
FIG. 11 is a perspective view of the structure obtained in the steps illustrated in FIGS. 10B-C and a set of four shelves, the view illustrating a fifth intermediate stage of assembly of the storage shelf assembly of FIG. 6B wherein the four shelves are positioned in the structure to form a shelf structure.
Figure 12A:
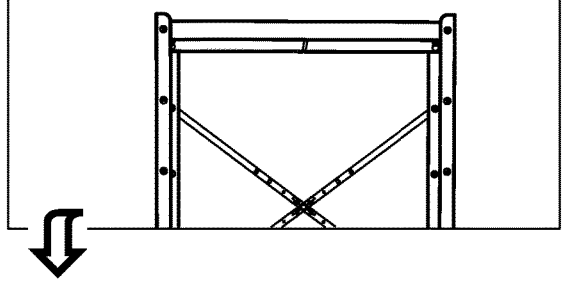
FIG. 12A is a detail view of the shelf of FIG. 6B as seen from the front.
Figure 12B:
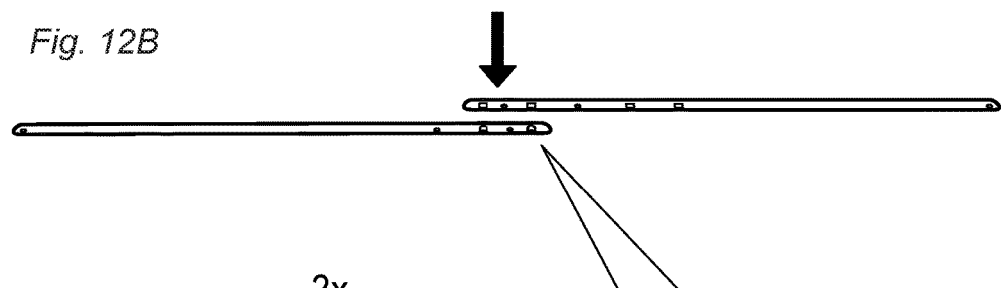
FIG. 12B is a plan view of a pair of brace halves to form a first brace of a cross brace.
Figure 12C:
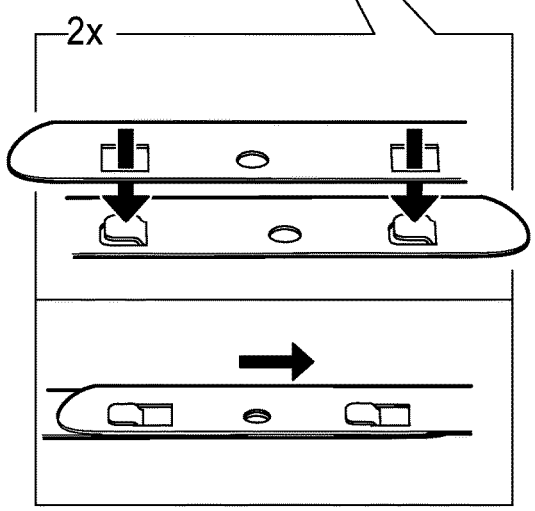
FIG. 12C is a perspective view of two steps of assembly of the pair of brace halves of FIG. 12B to form a brace, wherein the assembly is repeated to form two braces.
Figures 13A, 13B:
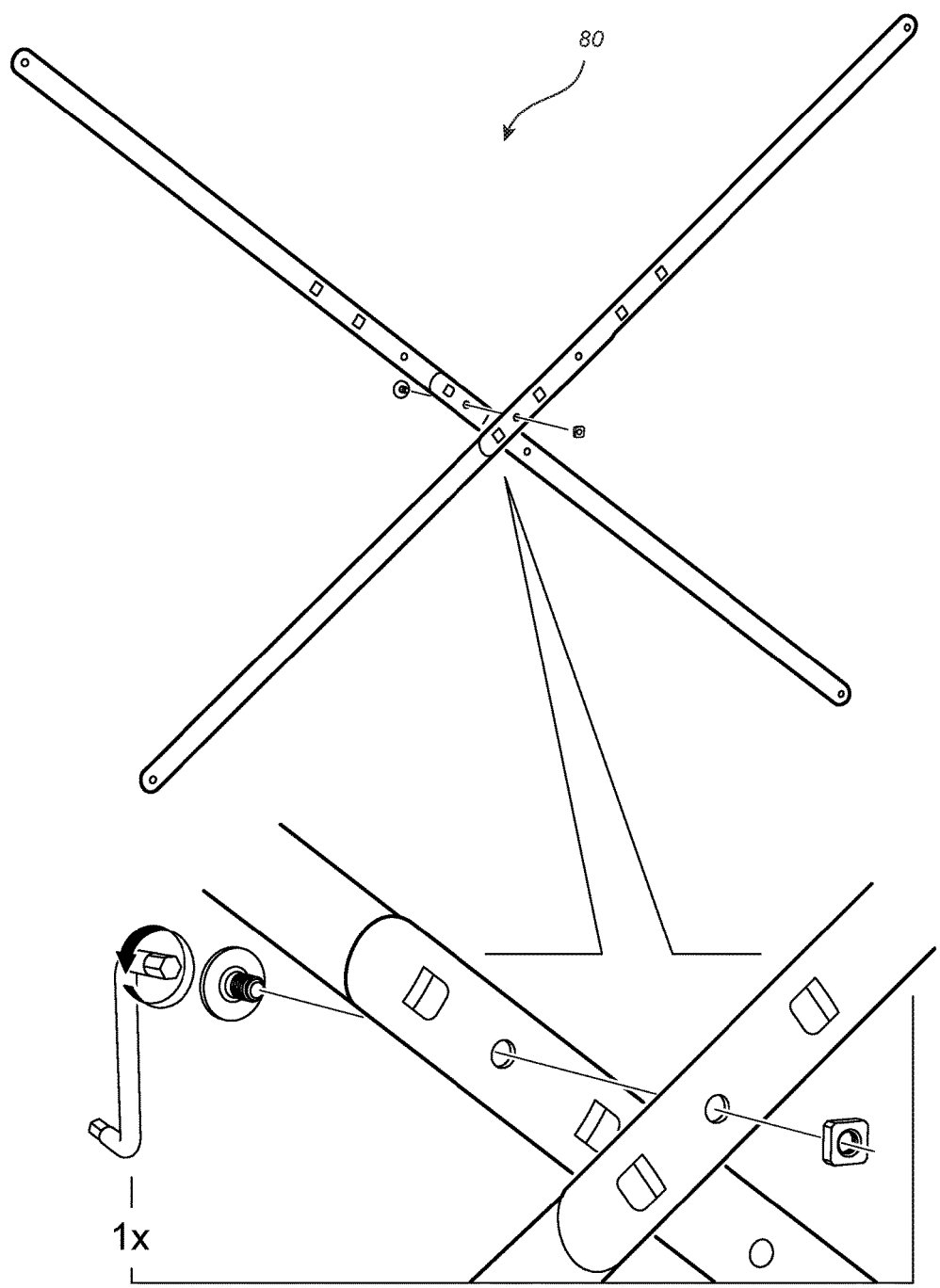
FIG. 13A is a perspective view of the two braces formed following the steps of FIG. 12C, the view illustrating the assembly of the two braces to form a cross-brace.
FIG. 13B is a magnified view of a portion of the view of FIG. 13A.

In FIG. 11, shelves 74 are placed in respective rectangular shelf support frames defined by four rectangularly arranged support beams 26. The shelves are carried by support edges 78a, 78b (FIG. 2H); depending on the thickness of the shelves, an upper support edge 78a or a lower support edge 78b may be selected to bring an upper face of the shelves 74 flush with an upper longitudinal edge of the carrier beams 26.

In FIGS. 12A-C and 13A-B, a cross brace 80 is assembled in a manner unrelated to the present invention.

In FIGS. 14A-B, the cross brace 80 is attached to the storage shelf frame 72 defined by the support beams 10 and the carrier beams 26. Ends 82 of the cross brace 80 are screwed to the support beams 10 by inserting cross brace attachment screws 84 via the through-holes 60 of the male connectors 16, and screwing the cross brace attachment screws 84 into rectangular nuts 86 supported by the inner edges 62a, 62b of the locking tabs 23a, 23b (FIG. 1B).

An extension foot 76a facilitates extending the storage shelf assembly 70, to form an extended storage shelf assembly 70a, as illustrated in FIG. 14C.

FIG. 15 illustrates the insertion of a fifth and a sixth support beam 10a into respective extension feet 76a. Also the fifth and the sixth support beams 10a may be identical to the first beam 10 disclosed hereinbefore.

FIG. 16 illustrates the attachment of the fifth and sixth support beams 10a to the support beams 10 already connected to the carrier beams 26. The fifth and sixth support beams may be screwed together via through-holes 60 (FIG. 3B) of male connector interfaces 16 of the fifth and sixth support beams 10a, which through-holes are in register with similar through-holes 60 (FIG. 3B) of the male connector interfaces 16 of the support beams 10 already connected to the carrier beams 26. The male connector interfaces of the beams 10, 10a may thereby be screwed together using a respective screw 84 and nut 86, wherein, again, the nut is supported by the inner edges 62a, 62b of the locking tabs 23a, 23b (FIG. 1B) of the male connection interface of either of the beams 10, 10a.

Thereafter, the storage shelf assembly 70 can be extended using additional support beams 10 and carrier beams 26 in a manner apparent to the skilled person, to obtain the extended storage shelf 70a assembly of FIG. 14C.

The invention has mainly been described above with reference to a few embodiments. However, as is readily appreciated by a person skilled in the art, other embodiments than the ones disclosed above are equally possible within the scope of the invention, as defined by the appended patent claims.

For example, the L-profiled first beam 10 is provided with a male connector interface 16 and the second beam 26 is provided with a female connector interface 34. Alternatively, the L-profiled first beam 10 may be provided with a female connector interface 34 and the second beam 26 may be provided with a male connector interface 16. The L-shaped cross-section portion of the first beam 10 may form part of a larger profile or cross-section, the overall shape of which is not the shape of an L. In embodiments, the axial end edge 32 of the second beam 26 may be non-straight, such that when connecting the first and second beams 10, 26 together in the manner described herein, the axial end edge 32 will engage with the inner face 14b of the second leg 12b of the first beam 10 only at points, along an intermittent, straight line of engagement. The beam connection angle formed between the axial end edge 32 and the second beam axis A2 should in such a situation be construed as the angle formed between second beam axis A2 and the intermittent, straight line of engagement defined by the axial end edge 32. In the claims, the word "comprising" does not exclude other elements or steps, and the indefinite article "a" or "an" does not exclude a plurality.

The invention claimed is:

1. A furniture frame system comprising
a first sheet metal beam extending along a first beam axis and having, as seen in a cross-section perpendicular to said first beam axis, an L-shaped cross-section portion comprising a first leg and a second leg, wherein an inner face of the first leg meets an inner face of the second leg at a leg angle, the inner face of said first leg comprising a first connector interface; and
    a second sheet metal beam extending along a second beam axis and comprising an axial end, the axial end having an axial end edge which forms a beam connection angle with the second beam axis, the axial end further comprising a second connector interface configured to mate with said first connector interface to connect said first and second sheet metal beams together such that said beam connection angle is formed between said first beam axis and said second beam axis,
wherein
one of said first and second connector interfaces is a male connector interface, the male connector interface comprising a male connector abutment face and a male connector extending from the male connector abutment face;
the other of said first and second connector interfaces is a female connector interface, the female connector interface comprising a female connector abutment face configured to engage with and abut the male connector abutment face along an abutment plane, and, opposite the female connector abutment face, a locking face, wherein the female connector interface further comprises an attachment slot in said female connector abutment face, the attachment slot comprising an insertion opening configured to receive the male connector, and a slider engagement edge extending from the insertion opening;
the male connector comprises a slot slider face configured to engage with and guide, or be guided by, the engagement edge of the attachment slot, and a locking edge extending along the male connector abutment face at a distance therefrom, the locking edge being configured to extend through the attachment slot to the locking face, to lock the male connector to the attachment slot in a direction normal to the abutment plane by engaging with the slider engagement edge at the locking face;
a distance between the first connector interface and the inner face of the second leg of the first sheet metal beam corresponds to a distance between the second connector interface and the axial end edge; and
at least one of said slider engagement edge and said slot slider face defines a connector guide line for guiding the second connector along the abutment plane, which guide line is inclined relative to the axial end edge such that when moving the second connector interface along the first beam axis, the sliding engagement between the slot slider face and the slider engagement edge presses the axial end edge towards a firm abutment with the inner face of the second leg.

2. The furniture frame system according to claim 1, wherein the male connector is arranged on the inner face of the first leg.

3. The furniture frame system according to claim 1, wherein the beam connection angle is between 45° and 135°, or between 70° and 110°, or about 90°.

4. The furniture frame system according to claim 1, wherein said guide line is inclined relative to the axial end edge by a guide line angle of between 1° and 5° or between 2° and 4°.

5. The furniture frame system according to claim 1, wherein said guide line has a substantially straight portion.

6. The furniture frame system according to claim 1, wherein each of said slider engagement edge and said slot slider face are inclined by the same inclination angle to define said guide line.

7. The furniture frame system according to claim 1, wherein the female connector interface comprises a first wedge extending from the locking face along the slider engagement edge and being configured to engage with the locking edge of the male connector to press, as the second connector is moved along the guide line, the female connector abutment face towards the male connector abutment face.

8. The furniture frame system according to claim 7, wherein the female connector interface further comprises a second wedge extending from the locking face along a slot edge opposite the slider engagement edge, the second wedge being configured to engage with a locking edge of the male connector to press, as the second connector is moved along the guide line, the female connector abutment face towards the male connector abutment face.

9. The furniture frame system according to claim 8, wherein the first and second wedges are joined by a connection ridge extending from the locking face.

10. The furniture frame system according to claim 1, wherein the male connector is provided with a through-hole at its center.

11. The furniture frame system according to claim 10, wherein the male connector comprises a pair of opposite, parallel edges facing each other, the opposite parallel edges being configured to support a nut.

12. The furniture frame system according to claim 1, wherein the male connector is integrally formed with the first beam.

13. The furniture frame system according to claim 1, wherein the male connector is formed by punching a crescent-shaped slot, and pressing a tab defined by said slot to form said slot slider face and said locking edge.

14. The furniture frame system according to claim 1, wherein the male connector comprises a pair of locking tabs extending in opposite directions, each locking tab being provided with a respective locking edge.

15. The furniture frame system according to claim 14, wherein a central male connector portion between said pair of locking tabs is offset relative to the male connector interface abutment face.

16. The furniture frame system according to claim 1, wherein a length of said axial end edge is at least 15 mm.

17. The furniture frame system according to claim 1, wherein said first and/or second sheet metal beam are/is formed of pressed steel sheet.

18. The furniture frame system according to claim 1, wherein the attachment slot is shaped as a keyhole.

19. The furniture frame system according to claim 1, wherein the leg angle is less than 135°, less than 110°, or a substantially right angle.

20. The furniture frame system according to claim 1, wherein the furniture frame system is a storage shelf frame.

21. The furniture frame according to claim 1, wherein the inner face of said second leg comprises a third connector interface, and the furniture frame system further comprises
a third sheet metal beam extending along a third beam axis and comprising an axial end, the axial end having an axial end edge which forms a beam connection angle with the third beam axis, the axial end further comprising a fourth connector interface configured to mate with said third connector interface to connect said first and third sheet metal beams together such that said beam connection angle is formed between said first beam axis and said third beam axis,
wherein
one of said third and fourth connector interfaces is a male connector interface, the male connector interface comprising a male connector abutment face and a male connector extending from the male connector abutment face;
the other of said third and fourth connector interfaces is a female connector interface, the female connector interface comprising a female connector abutment face configured to engage with and abut the male connector abutment face along an abutment plane, and, opposite the female connector abutment face, a locking face, wherein the female connector interface further comprises an attachment slot in said female connector abutment face, the attachment slot comprising an insertion opening configured to receive the male connector, and a slider engagement edge extending from the insertion opening;
the male connector comprises a slot slider face configured to engage with and be guided by the engagement edge of the attachment slot, and a locking edge extending along the male connector abutment face at a distance therefrom, the locking edge being configured to extend through the attachment slot to the locking face, to lock the male connector to the attachment slot in a direction normal to the abutment plane by engaging with the slider engagement edge at the locking face;
a distance between the third connector interface and the inner face of the first leg of the first sheet metal beam corresponds to a distance between the fourth connector interface and the axial end edge of the third beam; and
at least one of the slider engagement edge and the slot slider face of the third and fourth connector interfaces defines a connector guide line for guiding the fourth connector along the abutment plane, which guide line is inclined relative to the axial end edge such that when moving the fourth connector interface along the first beam axis, the sliding engagement between the slot slider face and the slider engagement edge presses the axial end edge towards a firm abutment with the inner face of the first leg, or with the second beam if already connected to the first beam.

22. A storage shelf assembly comprising a furniture frame system according to claim 1.

* * * * *